(12) United States Patent
Vohra et al.

(10) Patent No.: US 9,282,060 B2
(45) Date of Patent: Mar. 8, 2016

(54) METHODS AND APPARATUS FOR DYNAMIC RESOURCE MANAGEMENT WITHIN A DISTRIBUTED CONTROL PLANE OF A SWITCH

(75) Inventors: Quaizar Vohra, Santa Clara, CA (US); Umesh Kondur, Union City, CA (US); Nishanth Gaddam, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1090 days.

(21) Appl. No.: 12/968,848

(22) Filed: Dec. 15, 2010

(65) Prior Publication Data

US 2012/0155320 A1 Jun. 21, 2012

(51) Int. Cl.
*H04L 12/28* (2006.01)
*H04L 12/937* (2013.01)
*H04L 12/24* (2006.01)

(52) U.S. Cl.
CPC ........... *H04L 49/253* (2013.01); *H04L 41/0813* (2013.01)

(58) Field of Classification Search
USPC ......................................... 370/254, 217–220
See application file for complete search history.

(56) References Cited

U.S. PATENT DOCUMENTS

| 599,518 A | 2/1898 | Runge |
|---|---|---|
| 4,215,402 A | 7/1980 | Mitchell et al. |
| 4,942,574 A | 7/1990 | Zelle |
| 5,138,615 A | 8/1992 | Lamport et al. |
| 5,473,607 A | 12/1995 | Hausman et al. |
| 5,495,476 A | 2/1996 | Kumar |
| 5,689,508 A | 11/1997 | Lyles |
| 5,801,641 A | 9/1998 | Yang et al. |
| 5,825,772 A | 10/1998 | Dobbins et al. |
| 5,913,921 A | 6/1999 | Tosey et al. |
| 5,926,473 A | 7/1999 | Gridley |
| 5,987,028 A | 11/1999 | Yang et al. |
| 5,991,295 A | 11/1999 | Tout et al. |

(Continued)

FOREIGN PATENT DOCUMENTS

| CN | 101132286 | 2/2008 |
|---|---|---|
| EP | 1 318 628 A1 | 6/2003 |

(Continued)

OTHER PUBLICATIONS

RFC3746—Forwarding and Control Element Separation (ForCES) Framework, Yang et al, Apr. 2004.*

(Continued)

*Primary Examiner* — Thai Nguyen
(74) *Attorney, Agent, or Firm* — Cooley LLP

(57) ABSTRACT

In some embodiments, a switch fabric system includes multiple access switches configured to be operatively coupled to a switch fabric. The multiple access switches include multiple ports each to be operatively coupled to a peripheral processing device. A first set of ports from the multiple ports and a second set of ports from the multiple ports are managed by a first network control entity when the switch fabric system is in a first configuration. The first set of ports is managed by the first network control entity and the second set of ports is managed by a second network control entity when the switch fabric system is in a second configuration. The second network control entity is automatically initiated when the system is changed from the first configuration to the second configuration.

18 Claims, 10 Drawing Sheets

(56) References Cited

U.S. PATENT DOCUMENTS

| | | | |
|---|---|---|---|
| 6,049,542 A | 4/2000 | Prasad | |
| 6,049,546 A | 4/2000 | Ramakrishnan | |
| 6,073,160 A | 6/2000 | Grantham et al. | |
| 6,075,773 A | 6/2000 | Clark et al. | |
| 6,157,955 A | 12/2000 | Narad et al. | |
| 6,212,183 B1 | 4/2001 | Wilford | |
| 6,212,184 B1 | 4/2001 | Venkatachary et al. | |
| 6,226,629 B1 | 5/2001 | Cossock | |
| 6,246,692 B1 | 6/2001 | Dai et al. | |
| 6,266,705 B1 | 7/2001 | Ullum et al. | |
| 6,385,198 B1 | 5/2002 | Ofek et al. | |
| 6,393,026 B1 | 5/2002 | Irwin | |
| 6,457,058 B1 | 9/2002 | Ullum et al. | |
| 6,553,028 B1 | 4/2003 | Tang et al. | |
| 6,587,466 B1 | 7/2003 | Bhattacharya et al. | |
| 6,597,689 B1 | 7/2003 | Chiu et al. | |
| 6,600,741 B1 | 7/2003 | Chrin et al. | |
| 6,600,744 B1 | 7/2003 | Carr et al. | |
| 6,609,153 B1 | 8/2003 | Salkewicz | |
| 6,618,397 B1 | 9/2003 | Huang | |
| 6,639,910 B1 | 10/2003 | Provencher et al. | |
| 6,654,373 B1 | 11/2003 | Maher, III et al. | |
| 6,658,481 B1 | 12/2003 | Basso et al. | |
| 6,658,482 B1 | 12/2003 | Chen et al. | |
| 6,665,274 B1 | 12/2003 | Yamada | |
| 6,665,495 B1 | 12/2003 | Miles et al. | |
| 6,675,163 B1 | 1/2004 | Bass et al. | |
| 6,721,316 B1 | 4/2004 | Epps et al. | |
| 6,731,631 B1 | 5/2004 | Chang et al. | |
| 6,731,644 B1 | 5/2004 | Epps et al. | |
| 6,735,670 B1 | 5/2004 | Bronstein et al. | |
| 6,751,238 B1 | 6/2004 | Lipp et al. | |
| 6,754,662 B1 | 6/2004 | Li | |
| 6,778,532 B1 | 8/2004 | Akahane et al. | |
| 6,778,546 B1 | 8/2004 | Epps et al. | |
| 6,778,984 B1 | 8/2004 | Lu et al. | |
| 6,789,118 B1 | 9/2004 | Rao | |
| 6,813,243 B1 | 11/2004 | Epps et al. | |
| 6,816,486 B1 | 11/2004 | Rogers | |
| 6,823,454 B1 | 11/2004 | Hind et al. | |
| 6,850,704 B1 | 2/2005 | Dave | |
| 6,856,620 B1 | 2/2005 | Dunsmore et al. | |
| 6,859,455 B1 | 2/2005 | Yazdani et al. | |
| 6,862,278 B1 | 3/2005 | Chang et al. | |
| 6,865,673 B1 | 3/2005 | Nessett et al. | |
| 6,868,082 B1 | 3/2005 | Allen, Jr. et al. | |
| 6,876,652 B1 | 4/2005 | Bell et al. | |
| 6,889,225 B2 | 5/2005 | Cheng et al. | |
| 6,917,946 B2 | 7/2005 | Corl, Jr. et al. | |
| 6,925,085 B1 | 8/2005 | Krishna et al. | |
| 6,934,260 B1 | 8/2005 | Kanuri | |
| 6,940,862 B2 | 9/2005 | Goudreau | |
| 6,947,931 B1 | 9/2005 | Bass et al. | |
| 6,977,930 B1 | 12/2005 | Epps et al. | |
| 7,024,592 B1 | 4/2006 | Voas et al. | |
| 7,042,878 B2 | 5/2006 | Li | |
| 7,046,661 B2 | 5/2006 | Oki et al. | |
| 7,089,240 B2 | 8/2006 | Basso et al. | |
| 7,111,101 B1 * | 9/2006 | Bourke et al. | 710/305 |
| 7,133,400 B1 | 11/2006 | Henderson et al. | |
| 7,136,926 B1 | 11/2006 | Iyer et al. | |
| 7,173,931 B2 | 2/2007 | Chao et al. | |
| 7,177,919 B1 | 2/2007 | Truong et al. | |
| 7,180,862 B2 | 2/2007 | Peebles et al. | |
| 7,190,696 B1 | 3/2007 | Manur et al. | |
| 7,193,997 B2 | 3/2007 | Van Lunteren et al. | |
| 7,227,842 B1 | 6/2007 | Ji et al. | |
| 7,230,947 B1 | 6/2007 | Huber et al. | |
| 7,233,568 B2 | 6/2007 | Goodman et al. | |
| 7,233,579 B1 | 6/2007 | Crump et al. | |
| 7,245,629 B1 | 7/2007 | Yip et al. | |
| 7,248,760 B1 | 7/2007 | Corbalis et al. | |
| 7,277,429 B2 | 10/2007 | Norman et al. | |
| 7,289,513 B1 | 10/2007 | Medved et al. | |
| 7,315,897 B1 | 1/2008 | Hardee et al. | |
| 7,325,074 B2 | 1/2008 | McRae | |
| 7,330,467 B2 | 2/2008 | Sharma | |
| 7,349,415 B2 | 3/2008 | Rangarajan et al. | |
| 7,356,033 B2 | 4/2008 | Basu et al. | |
| 7,369,561 B2 | 5/2008 | Wybenga et al. | |
| 7,373,345 B2 | 5/2008 | Carpentier et al. | |
| 7,382,637 B1 | 6/2008 | Rathnavelu et al. | |
| 7,382,777 B2 | 6/2008 | Irish et al. | |
| 7,382,876 B2 | 6/2008 | Lauter et al. | |
| 7,383,244 B2 | 6/2008 | Bass et al. | |
| 7,394,809 B2 | 7/2008 | Kumar et al. | |
| 7,403,524 B2 | 7/2008 | Hill | |
| 7,403,526 B1 | 7/2008 | Zou et al. | |
| 7,406,038 B1 | 7/2008 | Oelke et al. | |
| 7,408,927 B2 | 8/2008 | George | |
| 7,415,034 B2 | 8/2008 | Muller et al. | |
| 7,415,627 B1 | 8/2008 | Radhakrishnan et al. | |
| 7,418,505 B2 | 8/2008 | Lim et al. | |
| 7,428,219 B2 | 9/2008 | Khosravi | |
| 7,430,171 B2 | 9/2008 | Black et al. | |
| 7,437,469 B2 | 10/2008 | Ellanti et al. | |
| 7,441,268 B2 | 10/2008 | Remedios | |
| 7,466,703 B1 | 12/2008 | Arunachalam et al. | |
| 7,471,676 B2 | 12/2008 | Wybenga et al. | |
| 7,480,302 B2 | 1/2009 | Choi | |
| 7,489,625 B2 | 2/2009 | Varma | |
| 7,496,252 B1 | 2/2009 | Corbalis et al. | |
| 7,505,458 B2 | 3/2009 | Menon et al. | |
| 7,519,054 B2 | 4/2009 | Varma | |
| 7,543,052 B1 | 6/2009 | Cesa Klein | |
| 7,564,869 B2 | 7/2009 | Cafiero et al. | |
| 7,586,909 B1 | 9/2009 | Walrand et al. | |
| 7,590,102 B2 | 9/2009 | Varma | |
| 7,596,614 B2 | 9/2009 | Saunderson et al. | |
| 7,602,787 B2 | 10/2009 | Cheriton | |
| 7,610,330 B1 | 10/2009 | Quinn et al. | |
| 7,646,771 B2 | 1/2010 | Guru et al. | |
| 7,664,123 B2 | 2/2010 | Ashwood Smith et al. | |
| 7,668,160 B2 | 2/2010 | Narayan et al. | |
| 7,688,816 B2 | 3/2010 | Park et al. | |
| 7,715,382 B2 | 5/2010 | Lakshman et al. | |
| 7,738,454 B1 | 6/2010 | Panwar et al. | |
| 7,746,799 B2 | 6/2010 | Kokot et al. | |
| 7,751,416 B2 | 7/2010 | Smith et al. | |
| 7,792,993 B1 | 9/2010 | Hopprich et al. | |
| 7,830,905 B2 | 11/2010 | Scott et al. | |
| 7,860,097 B1 | 12/2010 | Lovett et al. | |
| 7,877,483 B1 | 1/2011 | Finn | |
| 7,899,930 B1 | 3/2011 | Turner et al. | |
| 7,961,734 B2 | 6/2011 | Panwar et al. | |
| 8,054,832 B1 | 11/2011 | Shukla | |
| 8,089,904 B2 | 1/2012 | Balasubramaniam et al. | |
| 8,175,079 B2 | 5/2012 | Alapuranen et al. | |
| 2002/0009078 A1 | 1/2002 | Wilson et al. | |
| 2002/0019958 A1 | 2/2002 | Cantwell et al. | |
| 2002/0034183 A1 | 3/2002 | Prabhakar et al. | |
| 2002/0051450 A1 | 5/2002 | Ganesh et al. | |
| 2002/0061020 A1 | 5/2002 | Chao et al. | |
| 2002/0064170 A1 | 5/2002 | Siu et al. | |
| 2002/0118692 A1 | 8/2002 | Oberman et al. | |
| 2002/0138648 A1 | 9/2002 | Liu | |
| 2002/0141397 A1 | 10/2002 | Piekarski et al. | |
| 2002/0145974 A1 | 10/2002 | Saidi et al. | |
| 2002/0152209 A1 | 10/2002 | Merugu et al. | |
| 2002/0159449 A1 | 10/2002 | Carson et al. | |
| 2002/0168012 A1 | 11/2002 | Ramaswamy | |
| 2002/0191605 A1 | 12/2002 | Lunteren et al. | |
| 2003/0023846 A1 | 1/2003 | Krishna et al. | |
| 2003/0026287 A1 | 2/2003 | Mullendore et al. | |
| 2003/0030575 A1 | 2/2003 | Frachtenberg et al. | |
| 2003/0039212 A1 | 2/2003 | Lloyd et al. | |
| 2003/0053460 A1 | 3/2003 | Suda et al. | |
| 2003/0059045 A1 | 3/2003 | Ruehle | |
| 2003/0081540 A1 | 5/2003 | Jones et al. | |
| 2003/0084219 A1 | 5/2003 | Yao et al. | |
| 2003/0156586 A1 | 8/2003 | Lee et al. | |
| 2003/0200330 A1 | 10/2003 | Oelke et al. | |
| 2003/0200473 A1 | 10/2003 | Fung | |
| 2003/0219017 A1 | 11/2003 | Davis et al. | |

(56) References Cited

U.S. PATENT DOCUMENTS

| | | |
|---|---|---|
| 2003/0223420 A1 | 12/2003 | Ferolito |
| 2003/0223424 A1 | 12/2003 | Anderson et al. |
| 2003/0233516 A1 | 12/2003 | Davis et al. |
| 2004/0015599 A1 | 1/2004 | Trinh et al. |
| 2004/0023558 A1 | 2/2004 | Fowler et al. |
| 2004/0028046 A1 | 2/2004 | Govindarajan et al. |
| 2004/0030766 A1 | 2/2004 | Witkowski |
| 2004/0034702 A1 | 2/2004 | He |
| 2004/0034864 A1 | 2/2004 | Barrett et al. |
| 2004/0039820 A1 | 2/2004 | Colby et al. |
| 2004/0039986 A1 | 2/2004 | Solomon et al. |
| 2004/0054866 A1 | 3/2004 | Blumenau et al. |
| 2004/0062202 A1 | 4/2004 | Storr |
| 2004/0064559 A1 | 4/2004 | Kupst et al. |
| 2004/0076151 A1 | 4/2004 | Fant et al. |
| 2004/0095936 A1 | 5/2004 | O'Neill et al. |
| 2004/0100950 A1 | 5/2004 | Basu et al. |
| 2004/0100959 A1 | 5/2004 | Relan |
| 2004/0117438 A1 | 6/2004 | Considine et al. |
| 2004/0165598 A1 | 8/2004 | Shrimali et al. |
| 2004/0190526 A1 | 9/2004 | Kumar et al. |
| 2004/0254909 A1 | 12/2004 | Testa |
| 2004/0258067 A1 | 12/2004 | Irish et al. |
| 2004/0264373 A1 | 12/2004 | Engbersen et al. |
| 2005/0002334 A1 | 1/2005 | Chao et al. |
| 2005/0025141 A1 | 2/2005 | Chao et al. |
| 2005/0055428 A1 | 3/2005 | Terai et al. |
| 2005/0083935 A1 | 4/2005 | Kounavis et al. |
| 2005/0102549 A1 | 5/2005 | Davies et al. |
| 2005/0129017 A1 | 6/2005 | Guingo et al. |
| 2005/0138346 A1 | 6/2005 | Cauthron |
| 2005/0141510 A1 | 6/2005 | Narsinh et al. |
| 2005/0175017 A1 | 8/2005 | Christensen et al. |
| 2005/0180438 A1 | 8/2005 | Ko et al. |
| 2005/0193114 A1 | 9/2005 | Colby et al. |
| 2005/0226235 A1 | 10/2005 | Kumar et al. |
| 2005/0232258 A1 | 10/2005 | Wybenga et al. |
| 2005/0232261 A1 | 10/2005 | Wybenga et al. |
| 2005/0237938 A1 | 10/2005 | Corl, Jr. et al. |
| 2005/0267959 A1 | 12/2005 | Monga et al. |
| 2006/0005185 A1 | 1/2006 | Nguyen |
| 2006/0018379 A1 | 1/2006 | Cooper |
| 2006/0029072 A1 | 2/2006 | Perera et al. |
| 2006/0050690 A1 | 3/2006 | Epps et al. |
| 2006/0083247 A1 | 4/2006 | Mehta |
| 2006/0092940 A1 * | 5/2006 | Ansari et al. .................. 370/392 |
| 2006/0092975 A1 | 5/2006 | Ansari et al. |
| 2006/0164199 A1 | 7/2006 | Gilde et al. |
| 2006/0165070 A1 | 7/2006 | Hall et al. |
| 2006/0165085 A1 | 7/2006 | Konda |
| 2006/0165098 A1 | 7/2006 | Varma |
| 2006/0165111 A1 | 7/2006 | Varma |
| 2006/0165112 A1 | 7/2006 | Varma |
| 2006/0195896 A1 | 8/2006 | Fulp et al. |
| 2006/0198321 A1 | 9/2006 | Nadeau et al. |
| 2006/0218167 A1 | 9/2006 | Bosley et al. |
| 2006/0221954 A1 | 10/2006 | Narayan et al. |
| 2006/0221956 A1 | 10/2006 | Narayan et al. |
| 2006/0221967 A1 | 10/2006 | Narayan et al. |
| 2006/0269187 A1 | 11/2006 | Lin et al. |
| 2007/0002883 A1 | 1/2007 | Edsall et al. |
| 2007/0006056 A1 | 1/2007 | Lehner et al. |
| 2007/0008962 A1 | 1/2007 | Basu et al. |
| 2007/0036178 A1 | 2/2007 | Hares et al. |
| 2007/0070900 A1 | 3/2007 | Heink et al. |
| 2007/0071233 A1 | 3/2007 | Zak |
| 2007/0073882 A1 | 3/2007 | Brown et al. |
| 2007/0076710 A1 | 4/2007 | Khan |
| 2007/0115918 A1 | 5/2007 | Bodin et al. |
| 2007/0115986 A1 | 5/2007 | Shankara |
| 2007/0116043 A1 | 5/2007 | MeLampy et al. |
| 2007/0121499 A1 | 5/2007 | Pal et al. |
| 2007/0133593 A1 | 6/2007 | Shankara |
| 2007/0136489 A1 | 6/2007 | Temoshenko et al. |
| 2007/0153462 A1 | 7/2007 | Crippen et al. |
| 2007/0189283 A1 | 8/2007 | Agarwal et al. |
| 2007/0234005 A1 | 10/2007 | Erlingsson et al. |
| 2007/0280253 A1 | 12/2007 | Rooholamini et al. |
| 2007/0283045 A1 | 12/2007 | Nguyen et al. |
| 2007/0291535 A1 | 12/2007 | Eberle et al. |
| 2008/0031151 A1 | 2/2008 | Williams |
| 2008/0044181 A1 | 2/2008 | Sindhu |
| 2008/0065749 A1 | 3/2008 | Kueukyavuz et al. |
| 2008/0075071 A1 | 3/2008 | Beshai |
| 2008/0080548 A1 | 4/2008 | Mullendore et al. |
| 2008/0086768 A1 | 4/2008 | Mirza-Baig |
| 2008/0089323 A1 | 4/2008 | Elias et al. |
| 2008/0112133 A1 | 5/2008 | Torudbakken et al. |
| 2008/0126788 A1 | 5/2008 | Kreek et al. |
| 2008/0130517 A1 | 6/2008 | Lee et al. |
| 2008/0151863 A1 | 6/2008 | Lawrence et al. |
| 2008/0159277 A1 | 7/2008 | Vobbilisetty et al. |
| 2008/0165704 A1 | 7/2008 | Marchetti et al. |
| 2008/0177812 A1 | 7/2008 | Brandle |
| 2008/0186875 A1 | 8/2008 | Kitani |
| 2008/0186974 A1 | 8/2008 | Singh et al. |
| 2008/0192648 A1 | 8/2008 | Galles |
| 2008/0212472 A1 | 9/2008 | Musacchio et al. |
| 2008/0214059 A1 | 9/2008 | Rothermel et al. |
| 2008/0219184 A1 | 9/2008 | Fowler et al. |
| 2008/0228798 A1 | 9/2008 | Van Lunteren |
| 2008/0259555 A1 | 10/2008 | Bechtolsheim et al. |
| 2008/0275975 A1 | 11/2008 | Pandey et al. |
| 2008/0285449 A1 | 11/2008 | Larsson et al. |
| 2008/0315985 A1 | 12/2008 | Johnsen et al. |
| 2008/0317025 A1 | 12/2008 | Manula et al. |
| 2008/0320117 A1 | 12/2008 | Johnsen et al. |
| 2009/0037585 A1 | 2/2009 | Miloushev et al. |
| 2009/0049191 A1 | 2/2009 | Tolliver |
| 2009/0052345 A1 | 2/2009 | Brown et al. |
| 2009/0070775 A1 | 3/2009 | Riley |
| 2009/0074414 A1 | 3/2009 | Miles et al. |
| 2009/0109963 A1 | 4/2009 | Tanizawa et al. |
| 2009/0129775 A1 | 5/2009 | Handelman |
| 2009/0161692 A1 | 6/2009 | Hirata et al. |
| 2009/0196297 A1 | 8/2009 | Jabr |
| 2009/0213779 A1 | 8/2009 | Zhang et al. |
| 2009/0214208 A1 | 8/2009 | Beshai |
| 2009/0219830 A1 | 9/2009 | Venner et al. |
| 2009/0271851 A1 | 10/2009 | Hoppe et al. |
| 2009/0300608 A1 | 12/2009 | Ferris et al. |
| 2009/0304010 A1 | 12/2009 | Kurebayashi et al. |
| 2009/0328024 A1 | 12/2009 | Li et al. |
| 2010/0002382 A1 | 1/2010 | Aybay et al. |
| 2010/0002714 A1 | 1/2010 | George et al. |
| 2010/0017497 A1 | 1/2010 | Brown et al. |
| 2010/0020806 A1 | 1/2010 | Vahdat et al. |
| 2010/0040067 A1 | 2/2010 | Hao et al. |
| 2010/0061240 A1 | 3/2010 | Sindhu et al. |
| 2010/0061241 A1 | 3/2010 | Sindhu et al. |
| 2010/0061242 A1 | 3/2010 | Sindhu et al. |
| 2010/0061367 A1 | 3/2010 | Sindhu et al. |
| 2010/0061389 A1 | 3/2010 | Sindhu et al. |
| 2010/0061391 A1 | 3/2010 | Sindhu et al. |
| 2010/0080224 A1 | 4/2010 | Panwar et al. |
| 2010/0091779 A1 | 4/2010 | Juhl et al. |
| 2010/0097926 A1 | 4/2010 | Huang et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0182933 A1 | 7/2010 | Hu et al. |
| 2010/0189121 A1 | 7/2010 | Beshai |
| 2010/0192202 A1 | 7/2010 | Ker |
| 2010/0214949 A1 | 8/2010 | Smith et al. |
| 2010/0265832 A1 | 10/2010 | Bajpay et al. |
| 2010/0306408 A1 | 12/2010 | Greenberg et al. |
| 2011/0052191 A1 | 3/2011 | Beshai |
| 2011/0069706 A1 | 3/2011 | Sen et al. |
| 2011/0161468 A1 | 6/2011 | Tuckey et al. |
| 2012/0033665 A1 | 2/2012 | Jacob Da Silva et al. |
| 2012/0069842 A1 | 3/2012 | Reddy et al. |
| 2012/0093154 A1 | 4/2012 | Rosenberg et al. |
| 2012/0128004 A1 | 5/2012 | Aybay et al. |
| 2012/0155453 A1 | 6/2012 | Vohra |

(56) References Cited

U.S. PATENT DOCUMENTS

| | | | |
|---|---|---|---|
| 2012/0158930 | A1 | 6/2012 | Kalusivalingam et al. |
| 2012/0158942 | A1 | 6/2012 | Kalusivalingam et al. |
| 2012/0189009 | A1 | 7/2012 | Shekhar et al. |
| 2013/0003726 | A1 | 1/2013 | Sindhu et al. |

FOREIGN PATENT DOCUMENTS

| | | | |
|---|---|---|---|
| EP | 1 758 320 | A1 | 2/2007 |
| EP | 1 892 905 | A1 | 2/2008 |
| EP | 1 924 030 | A1 | 5/2008 |
| EP | 2 164 209 | A1 | 3/2010 |
| EP | 2 413 550 | A1 | 7/2011 |
| EP | 2 369 782 | A1 | 9/2011 |
| EP | 2 456 138 | A1 | 5/2012 |
| EP | 2 466 825 | A1 | 6/2012 |
| EP | 2 466 826 | A1 | 6/2012 |
| GB | 2 362 289 | A | 11/2001 |
| WO | WO 00/08801 | | 2/2000 |
| WO | WO 2008/144927 | A1 | 12/2008 |

OTHER PUBLICATIONS

U.S. Appl. No. 12/345,498, filed Dec. 29, 2008, entitled "Control Plane Architecture for Switch Fabrics".
Office Action for U.S. Appl. No. 12/345,498, mailed Apr. 28, 2010.
Final Office Action for U.S. Appl. No. 12/345,498, mailed Oct. 26, 2010.
U.S. Appl. No. 12/415,504, filed Mar. 31, 2009, entitled "Methods and Apparatus for Dynamic Automated Configuration Within a Control Plane of a Switch Fabric".
Office Action for U.S. Appl. No. 12/415,504, mailed Apr. 30, 2012.
Final Office Action for U.S. Appl. No. 12/415,504, mailed Oct. 10, 2012.
Office Action for U.S. Appl. No. 13/053,801, mailed Dec. 6, 2012.
Office Action for U.S. Appl. No. 12/969,233, mailed Nov. 20, 2012.
U.S. Appl. No. 12/968,846, filed Dec. 15, 2010, entitled "Host Side Protocols for Use With Distributed Control Plane of a Switch".
Office Action for U.S. Appl. No. 12/968,846, mailed Oct. 31, 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, mailed Sep. 13, 2012.
U.S. Appl. No. 12/968,769, filed Dec. 15, 2010 entitled "Systems and Methods for Automatically Detecting Network Elements".
Office Action mailed Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action mailed Nov. 7, 2012 for U.S. Appl. No. 12/968,886, filed Dec. 10, 2010.
Office Action mailed Jul. 30, 2012 for U.S. Appl. No. 12/968,957, filed Dec. 10, 2010.
Office Action mailed Sep. 17, 2012 for U.S. Appl. No. 12/951,706, mailed Sep. 17, 2012.
U.S. Appl. No. 13/435,919, filed Mar. 30, 2012, entitled "Methods and Apparatus for Virtualizing Switch Control Plane Engine".
Office Action mailed Mar. 14, 2013 for U.S. Appl. No. 13/197,212, filed Aug. 3, 2011.
U.S. Appl. No. 13/342,277, filed Dec. 22, 2011, entitled "Methods and Apparatus for Using Border Gateway Protocol (BGP) for Converged Fibre Ciiannel (FC) Control Plane".
U.S. Appl. No. 13/333,031, filed Dec. 21, 2011, entitled "Methods and Apparatus for a Distributed Fibre Channel Control Plane".
U.S. Appl. No. 13/333,039, filed Dec. 21, 2011, entitled "Methods and Apparatus for a Distributed Fibre Channel Control Plane".
U.S. Appl. No. 13/197,212, filed Aug. 3, 2011, entitled "Methods and Apparatus for Route Installation Acknowledgement and Acknowledgement Aggregation in BGP".

Office Action mailed Mar. 25, 2013 for U.S. Appl. No. 12/969,277, filed Dec. 15, 2010.
F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.
Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.
Extended Search Report for European Application No. 11158837.2, mailed Jun. 21, 2011.
Extended Search Report for European Application No. 11179603.3, mailed Dec. 21, 2011.
Extended Search Report for European Application No. 11192571.5, mailed Mar. 19, 2012.
Extended Search Report for European Application No. 11192565.7, mailed Mar. 30, 2012.
Extended Search Report for European Application No. 11174003.1, mailed Feb. 8, 2012.
Extended Search Report for European Application No. 11175433.9, mailed Oct. 7, 2011.
Itamar Elhanany et al. "High-performance Packet Switching Architectures" Springer Science & Business Media, ISBN-10: 184628273X, 2002, Chapter 10, 20 pages.
H. Jonathan Chao et al. "Matching Algorithms for Three-Stage Bufferless Clos Network Switches" IEEE Communications Magazine, Oct. 2003, pp. 46-54.
Jonathan S. Turner et al. "Multirate Clos Networks" IEEE Communications Magazine, Oct. 2003, pp. 1-11.
U.S. Appl. No. 12/242,143, filed Sep. 30, 2008, entitled "Methods and Apparatus for Compression in Packet Classification" (34 pgs).
U.S. Appl. No. 12/242,125, filed Sep. 30, 2008, entitled "Methods and Apparatus for Range Matching During Packet Classification Based on a Linked-Node Structure" (39 pgs).
U.S. Appl. No. 12/242,278, filed Sep. 30, 2008, entitled "Methods and Apparatus to Implement Except Condition During Data Packet Classification" (35 pgs).
U.S. Appl. No. 12/242,158, filed Sep. 30, 2008 entitled "Methods and Apparatus for Producing a Hash Value Based on a Hash Function" (37 pgs).
U.S. Appl. No. 12/347,495, filed Dec. 31, 2008 entitled "Methods and Apparatus for Packet Classification Based on Multiple Conditions" (40 pgs).
U.S. Appl. No. 12/347,499, filed Dec. 31, 2008 entitled "Methods and Apparatus for Packet Classification Based on Multiple Conditions" (41 pgs).
U.S. Appl. No. 12/347,418, filed Dec. 31, 2008 entitled "Methods and Apparatus for Indexing Set Bit Values in a Long Vector Associated with a Switch Fabric" (35 pgs).
Search Report for European Application No. 09170037.7 mailed Dec. 10, 2009 (7 pages).
Office Action mailed Feb. 16, 2010 for U.S. Appl. No. 12/242,172 (11 pages).
Office Action mailed Feb. 17, 2010 for U.S. Appl. No. 12/242,168 (12 pages).
Office Action mailed Apr. 23, 2010 for U.S. Appl. No. 12/347,495 (II pages).
Office Action mailed May 10, 2010 for U.S. Appl. No. 12/242,143 (23 pages).
U.S. Appl. No. 121794,175, filed Jun. 4, 2010 entitled "Methods and Apparatus Related to Packet Classification Based on Range Values" (42 pgs).
Office Action mailed Jun. 10, 2010 for U.S. Appl. No. 12/242,278, filed Sep. 30, 2008 (24 pages).

(56) References Cited

OTHER PUBLICATIONS

U.S. Appl. No. 12/874,681, filed Sep. 2, 2010, entitled "Methods and Apparatus for Range Matching During Packet Classification Based on a Linked-Node Structure" (42 pages).
Final Office Action mailed Oct. 13, 2010 for U.S. Appl. No. 12/347,495 (14 pages).
Office Action mailed Apr. 20, 2011 for U.S. Appl. No. 12/495,364 (18 pages).
Office Action mailed May 11, 2011 for U.S. Appl. No. 12/495,344 (11 pages).
Office Action mailed Jun. 15, 2011 for U.S. Appl. No. 12/495,361 (22 pages).
Final Office Action mailed Oct. 21, 2011 for U.S. Appl. No. 12/495,364.
Office Action mailed Dec. 21, 2011 for U.S. Appl. No. 12/495,358.
Office Action mailed Jan. 4, 2012 for U.S. Appl. No. 12/495,344.
Office Action mailed Jan. 5, 2012 for U.S. Appl. No. 12/495,361.
Office Action mailed Mar. 26, 2012 for U.S. Appl. No. 12/558,130.
Final Office Action mailed Sep. 13, 2012 for U.S. Appl. No. 12/495,361.
Final Office Action mailed Sep. 13, 2012 for U.S. Appl. No. 12/495,344.
Search Report for European Application No. 12185735.3 mailed Oct. 29, 2012.
Chinese Office Action dated Nov. 30, 3012 issued in corresponding Chinese Application No. 200910246898.X.
Chinese Office Action dated Jan. 27, 2014 issued in corresponding Chinese Application No. 201110272107.8.
Chinese Office Action dated Nov. 30, 2014 issued in corresponding Chinese Application No. 201110272107.8.
Office Action for Chinese Patent Application 201110272107.8 dated Jun. 30, 2015.

* cited by examiner

| Configuration File 500 | |
|---|---|
| NCE | Configuration |
| NCE 471 | A |
| NCE 472 | B |
| NCE 473 | C |

FIG. 9

| Configuration File 510 | |
|---|---|
| NCE | Configuration |
| NCE 471 | A |
| NCE 472 | B |
| NCE 473 | C' |
| NCE 477 | C" |

FIG. 10

| Configuration File 520 ||
|---|---|
| NCE | Configuration |
| NCE 471 | A |
| NCE 472 | B |
| NCE 478 | C |

FIG. 11

| Configuration File 525 ||
|---|---|
| NCE | Configuration |
| NCE 473 | C' |
| NCE 477 | C" |

FIG. 12

| Configuration File 530 ||
|---|---|
| NCE | Configuration |
| NCE 472 | AB |
| NCE 473 | C |

FIG. 13

METHODS AND APPARATUS FOR DYNAMIC RESOURCE MANAGEMENT WITHIN A DISTRIBUTED CONTROL PLANE OF A SWITCH

BACKGROUND

Some embodiments described herein relate generally to resource management, and, in particular, to dynamic allocation of resource management within a distributed control plane of a switch.

Some known networking systems include a centralized control plane that can manage resources connected to the networking system. For example, the centralized control plane can maintain a database associated with the physical location of the resources. Additionally, the centralized control plane can manage forwarding-state information associated with the resources. Such a centralized control plane, however, can become extremely large and unmanageable when a large number of resources are connected to the networking system.

Other known networking systems include a distributed control plane. Such known distributed control planes can be implemented at various nodes within the networking system. Such known distributed control planes, however, are not dynamically configured. As such, some nodes within the networking system can be largely under-utilized while other nodes within the networking system can be over-utilized. Accordingly, such networking systems do not operate as efficiently as possible.

Accordingly, a need exists for a networking system having distributed control plane that can be dynamically configured based on the processing needs of the networking system.

SUMMARY OF THE INVENTION

In some embodiments, a switch fabric system includes multiple access switches configured to be operatively coupled to a switch fabric. The multiple access switches include multiple ports each to be operatively coupled to a peripheral processing device. A first set of ports from the multiple ports and a second set of ports from the multiple ports are managed by a first network control entity when the switch fabric system is in a first configuration. The first set of ports is managed by the first network control entity and the second set of ports is managed by a second network control entity when the switch fabric system is in a second configuration. The second network control entity is automatically initiated when the system is changed from the first configuration to the second configuration.

BRIEF DESCRIPTION OF THE DRAWINGS

FIGS. 9-13 are illustrations of configuration files to be sent to network control entities within a switch fabric system, according to an embodiment.

DETAILED DESCRIPTION

Figure 1:
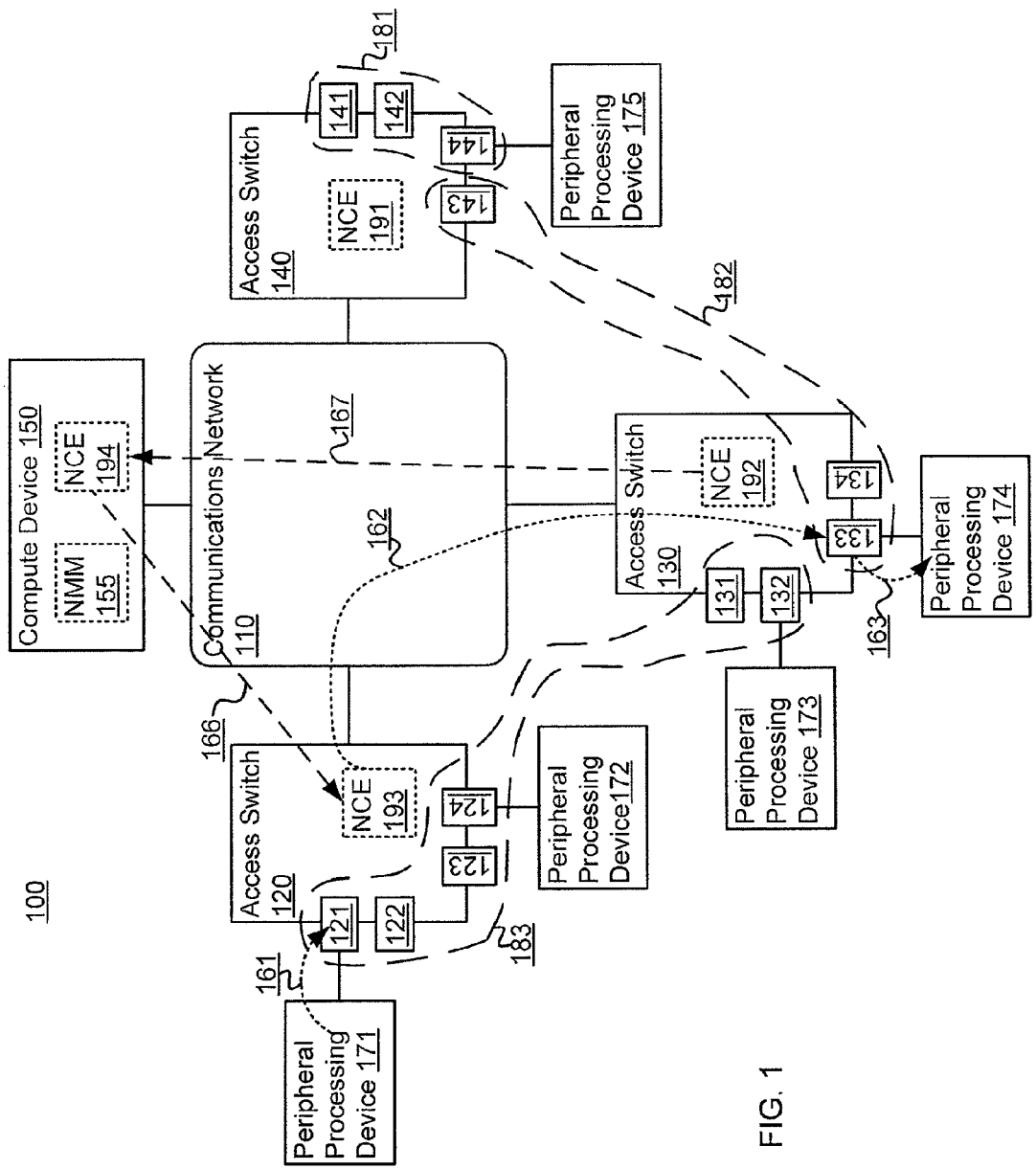
FIG. 1 is a schematic illustration of a switch fabric system, according to an embodiment.

In some embodiments, a switch fabric system includes multiple access switches configured to be operatively coupled to a switch fabric. The multiple access switches include multiple ports each to be operatively coupled to a peripheral processing device. A first set of ports from the multiple ports and a second set of ports from the multiple ports are managed by a first network control entity when the switch fabric system is in a first configuration. The first set of ports is managed by the first network control entity and the second set of ports is managed by a second network control entity when the switch fabric system is in a second configuration. The second network control entity is automatically initiated when the system is changed from the first configuration to the second configuration.

In some embodiments, the switch fabric system can automatically change and/or move from the first configuration to the second configuration when an available processing capacity of the first network control entity crosses (e.g., falls below) a threshold. Similarly stated, the switch fabric system can automatically change and/or move from the first configuration to the second configuration when the first network control entity is not capable of managing both the first set of ports and the second set of ports (e.g., does not have the capacity and/or processing resources). In such embodiments, a network management module can monitor the available capacity of the first network control entity and initiate the second network control entity when the switch fabric system changes from the first configuration to the second configuration.

In some embodiments, a non-transitory processor-readable medium stores code representing instructions to cause a processor to send a first signal to a first access switch from a set of access switches during a first time period. The first signal is operable to initiate a first network control entity. A first set of ports at the set of access switches is associated with the first network control entity in response to the initiation of the first network control entity. The code further represents instructions to cause the processor to send a second signal to a second access switch from the set of access switches during the first time period. The second signal is operable to initiate a second network control entity. A second set of ports at the set of access switches is associated with the second network control entity in response to the initiation of the second network control entity. The second set of ports is mutually exclusive of the first set of ports. The code represents instructions to cause the processor to send a third signal to the first access switch and the second access switch to terminate, deactivate and/or deallocate the second network control entity during a second time period after the first time period. The third signal is operable to associate the second set of ports with the first network control entity.

In some embodiments, the third signal is sent to the first access switch and the second access switch when an available processing capacity of the first network control entity and/or the second network control entity crosses (e.g., exceeds) a threshold. In some embodiments, for example, the third signal can be sent when a combined available processing capacity of the first network control entity and the second network control entity crosses a threshold. In such embodiments, a combined available processing capacity above the threshold can indicate that a single network control entity can manage and/or control the first set of ports and the second set of ports.

In some embodiments, a system includes a network management module and a network control entity. The network management module manages a configuration table associated with a switch fabric. The network control entity manages a set of ports from multiple ports. Each port from the multiple ports is located at a first access switch from a set of access switches or a second access switch from the set of access switches. The set of access switches is configured to be operatively coupled to the switch fabric. The network control entity is located at the first access switch from the set of access switches. The set of ports includes at least one port located at the first access switch and at least one port located at the second access switch from the set of access switches. The network control entity can receive a portion of the configuration table from the network management module associated with the set of ports.

Embodiments shown and described herein refer to multiple communication layers (e.g., data link layer (layer-2), network layer (layer-3), physical layer (layer-1), application layer (layer-7), etc.). Such communication layers can be defined by open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer while a Border Gateway Protocol (BGP) can be associated with and/or implemented at a higher layer, such as, for example, an application layer. While a BGP can be implemented at the application layer, it can be used to send forwarding-state information (e.g., port identifiers, network segment identifiers, peripheral processing device identifiers, etc.) used to populate a routing table associated with a network layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-175. The peripheral processing devices 171-175 are operatively coupled to each other by remaining portions of the switch fabric system 100. The peripheral processing devices 171-175 can be, for example, compute nodes, service nodes, routers, and storage nodes, as described in further detail herein. In some embodiments, for example, the peripheral processing devices 171-175 include servers, storage devices, gateways, workstations, and/or the like.

The peripheral processing devices 171-175 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-175 can be operatively coupled to an access switch 120, 130, 140, as described in further detail herein. As such, the peripheral processing devices 171-175 can send data (e.g., data packets, data cells, etc.) to and receive data from the access switches 120, 130, 140. In some embodiments, the connection between the peripheral processing devices 171-175 and the access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device that operatively couples peripheral processing devices 171-175 to the communications network 110. In some embodiments, for example, the access switches 120, 130, 140 can be edge devices, input/output modules, top-of-rack devices and/or the like. Structurally, the access switches 120, 130, 140 can function as both source access switches and destination access switches. Accordingly, the access switches 120, 130, 140 can send data (e.g., a data stream of data packets and/or data cells) to and receive data from the communications network 110, and to and from the connected peripheral processing devices 171-175.

Each of the access switches 120, 130, 140 is operable to communicate with the other access switches 120, 130, 140 via the communications network 110 (e.g., within both a control plane portion and data plane portion). Specifically, the data plane portion of the communications network 110 provides any-to-any connectivity between the access switches 120, 130, 140 at relatively low latency. For example, the data plane portion of the communications network 110 can transmit (e.g., convey) data between access switches 120, 130, 140. In some embodiments, the communications network 110 can have at least hundreds or thousands of ports (e.g., egress ports and/or ingress ports) through which access switches 120, 130, 140 can transmit and/or receive data.

Figure 2:
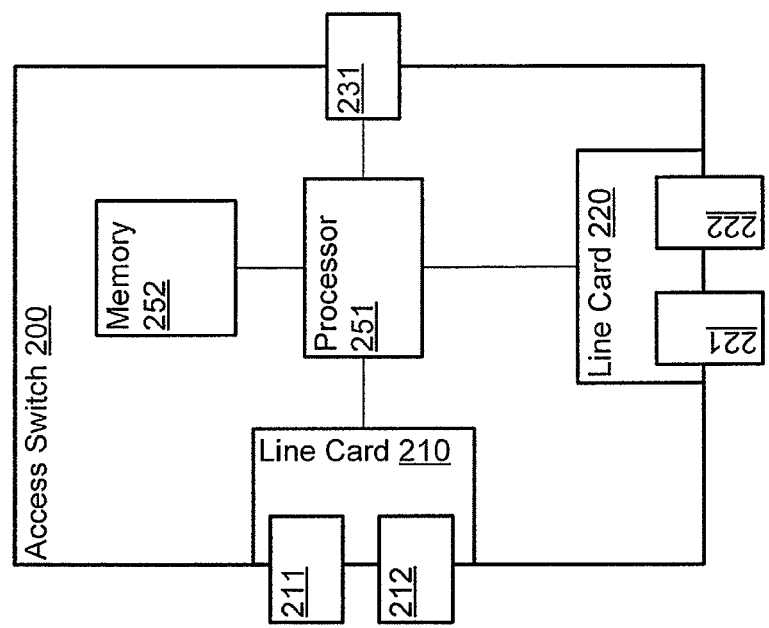
FIG. 2 is a schematic illustration of an access switch of a switch fabric system, according to another embodiment.

FIG. 2 is a system block diagram of an access switch 200 similar to the access switches 120, 130, 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories.

Similar to the ports 121-124, 131-134, 141-144 of the access switches 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be in communication with other access switches via a communications network such as a switch fabric (e.g., data plane portion of communications network 110). Port 231 can be part of one or more network interfaces (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a protocol based on data packets and port 231 can communicate via a switch fabric using a protocol based on data cells. Said differently, access switch 200 can be an edge device of a network switch such as a distributed network switch.

In some embodiments, the access switch 200 can prepare a data packet (e.g., an Ethernet packet) to enter a communications network (e.g., communications network 110). For example, the access switch 200 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, and as described in further detail herein, the access switches 120, 130, 140 can host network control entities 191-193 to manage the ports 121-124, 131-134, 141-144 of the access switches 120, 130, 140. Accordingly, the network control entities 191-193 can be part of a control plane of the switch fabric system 100. Each network control entity 191-193 can be a process, application, virtual machine, and/or some other software module (executing in hardware) or a hardware module executed at an access switch 120, 130, 140 or a compute device 150. As such, instructions that implement the network control entity 191-193 can be stored within a memory of an access switch 120, 130, 140 (e.g., memory 252) and executed at a processor of an access switch 120, 130, 140 (e.g., processor 251).

Each network control entity 191-193 can manage ports 121-124, 131-134, 141-144 of the access switches 120, 130, 140. For example, network control entity 191 is operable to manage the ports 141, 142, 144 associated with the group of ports 181, network control entity 192 is operable to manage the ports 133, 134, 143 associated with the group of ports 182, and network control entity 193 is operable to manage the ports 121, 122, 123, 124, 131, 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 181, 182, 183, monitor a state and/or status of peripheral processing devices associated with its group of ports 181, 182, 183, and/or manage and maintain other information associated with the peripheral processing devices and/or ports associated with its group of ports 181, 182, 183, respectively.

In some embodiments, a network control entity can control and/or manage ports at an access switch at which the network control entity is located (e.g., network control entity 191 manages the group of ports 181). In other embodiments, a network control entity can also control and/or manage ports at an access switch other than the access switch at which the network control entity is located (e.g., network control entity 193 manages ports 131 and 132, and network control entity 192 manages port 143). In such embodiments, the network management module 155 has flexibility to assign each port 121-124, 131-134, 141-144 to a network control entity 191-193 based on processing capacity. Additionally, in such embodiments, the network management module 155 is not constrained by the physical location of the network control entities 191-193 and/or the ports 121-124, 131-134, 141-144 when assigning the ports 121-124, 131-134, 141-144 to a network control entity 191-193.

The compute device 150 can host management modules, processes and/or functions associated with the switch fabric system 100. As shown in FIG. 1, the compute device 150 can host a network management module 155 and a network control entity 194. The network control entity 194 can function as a route reflector between the other network control entities 191-193. Similarly stated, the network control entity 194 can function as an intermediary network control entity between the network control entities 191-193 at the access switches 120, 130, 140. The network management module 155 and the network control entity 194 can be part of the control plane of the switch fabric system 100.

Figure 4:
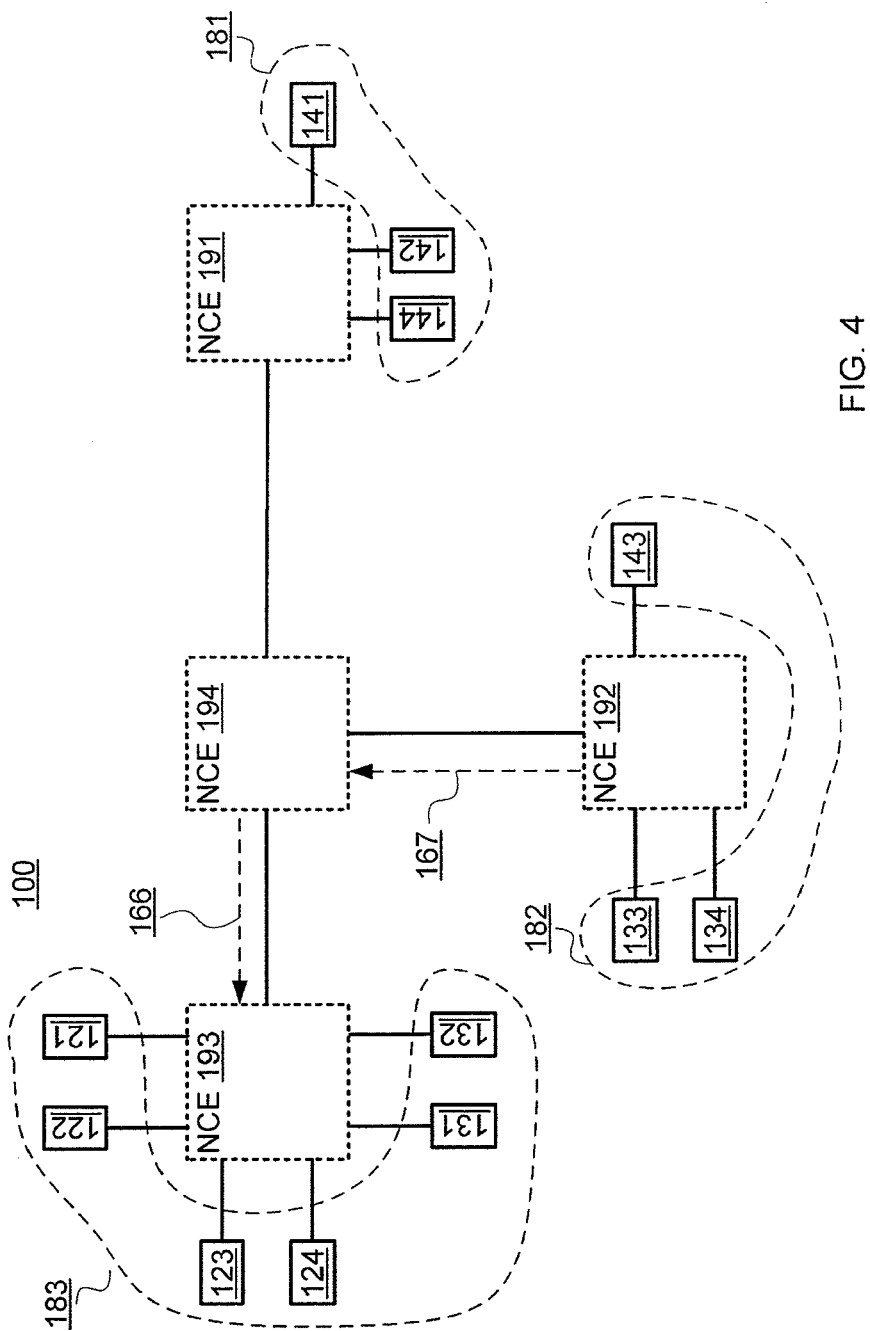
FIG. 4 is a logical representation of a control plane of the switch fabric system of FIG. 1.

FIG. 4, for example, is a block diagram of a logical topology of the control plane of the switch fabric system 100, shown in FIG. 1. As shown in FIG. 4, in the control plane, the network control entities 191-193 are operatively coupled to each other through the network control entity 194. As shown in FIG. 1, and as described in further detail herein, such a connection can be through a control plane portion of the communications network 110.

The network control entities 191-193 can send forwarding-state information (e.g., using a control signal) to each other via the network control entity 194. For example, as described in further detail herein, network control entity 192 can send forwarding-state information associated with the group of ports 182 to the network control entity 193 via the network control entity 194 (e.g., shown as path 166 and path 167). In such an example, the path between the network control entity 192 and the network control entity 193 can be said to include two physical hops as well as two logical hops. Similarly stated, the control plane of the switch fabric system 100 can include multiple logical and physical hops. In some embodiments, the network control entity 194 can be said to be a route reflector (e.g., a Boarder Gateway Protocol (BGP) Route Reflector).

In some embodiments, the network control entities 191-193 can send forwarding-state information to the other network control entities 191-193 over the control plane using a targeted higher level protocol (e.g., an application layer protocol) such as, for example, a Boarder Gateway Protocol (BGP). In such embodiments, a network control entity 191-193 can use such a higher level protocol in conjunction with any suitable lower level protocol (e.g., a data link layer protocol), such as, for example, Ethernet and/or Fibre channel, to send the forwarding-state information. While BGP can be implemented at the application layer, it can be used to send forwarding-state information used to populate a routing table (e.g., stored at the network control entities 191-193) associated with a network layer. Using a targeted protocol, such as BGP, a network control entity 191-193 can send the forwarding-state information to specific network control entities 191-193 while refraining from sending the forwarding-state information to other network control entities 191-193, as described in further detail herein.

In some embodiments, the network control entity 194 can store an address and/or identifier associated with the network control entities 191-193. In such embodiments, when a network control entity 191-193 has updated forwarding-state information to distribute, the network control entity 191-193 can send the updated forwarding-state information to the network control entity 194. The network control entity 194 can then send the forwarding-state information to the other network control entities 191-193. In other embodiments, the network control entities 191-193 are directly coupled to each other within the control plane without a network control entity 194 acting as a route reflector. In such embodiments, the network control entities 191-193 can store an address and/or identifier associated with the other network control entities 191-193 and send updated forwarding-state information directly to the other network control entities 191-193 via the control plane.

In some embodiments, each network control entity 191-193 can be part of a network segment (e.g., a virtual local area network (VLAN), a virtual switch fabric, etc.). For example, network control entity 192 and network control entity 193 can be part of a first network segment and network control entity 191 can be part of a second network segment. In such embodiments, each network control entity 191-193 only sends forwarding-state information to the other network control entities within the same network segment. Accordingly, the network control entity 194 only sends updated forwarding-state information received from a network control entity 191-193 to the other network control entities 191-193 associated with its network segment. As such, in the above example the network control entity 192 sends forwarding-state information to the network control entity 193 but not the network control entity 191. Accordingly, the ports 141, 142, 144 associated with the network control entity 191 (associated with the second network segment) do not send data to the ports 121-124, 131-134, 143 associated with the network control entities 192 and 193 (associated with the first network segment).

Returning to FIG. 1, the network management module 155 can be a process, application, virtual machine, and/or some other software module (executing in hardware) or a hardware module executed at the compute device 150. The network management module 155 can divide and/or partition the ports 121-124, 131-134, 141-144 of the access switches 120, 130, 140 into the groups of ports 181, 182, 183 to be managed by network control entities 191-193. As such, the network management module 155 can associate the group of ports 181 with the network control entity 191, the group of ports 182 with the network control entity 192 and the group of ports 183 with the network control entity 193. Additionally, as described in further detail herein, the network management module 155 can also monitor an available processing capacity of each network control entity 191-194 and initiate and/or terminate network control entities 191-194 when the available processing capacity of a network control entity 191-194 crosses (e.g., falls below) a first threshold and/or crosses (e.g., exceeds) a second threshold.

In some embodiments, the network management module 155 can store (e.g., in a memory) a configuration file associated with configuration information (e.g., port protocol information, network segment assignment information, port assignment information, peripheral processing device information, etc.) and/or forwarding-state information (e.g., routing information, port identifiers, network segment identifiers, peripheral processing device identifiers, etc.) associated with the switch fabric system 100. As described in further detail herein, the network management module 155 can send a portion of the routing information associated with a group of ports 181, 182, 183 to the network control entities 191-193 via the control plane portion of the communications network 110. Similarly, the network management module 155 can send a portion of the routing information associated with each network control entity 191-193 to the network control entity 194. For example, the network management module 155 can send a portion of the configuration file associated with the group of ports 181 to the network control entity 191. For another example, the network management module can send a portion of the configuration file associated with the network control entities 191-193 to the network control entity 194.

Figure 3:
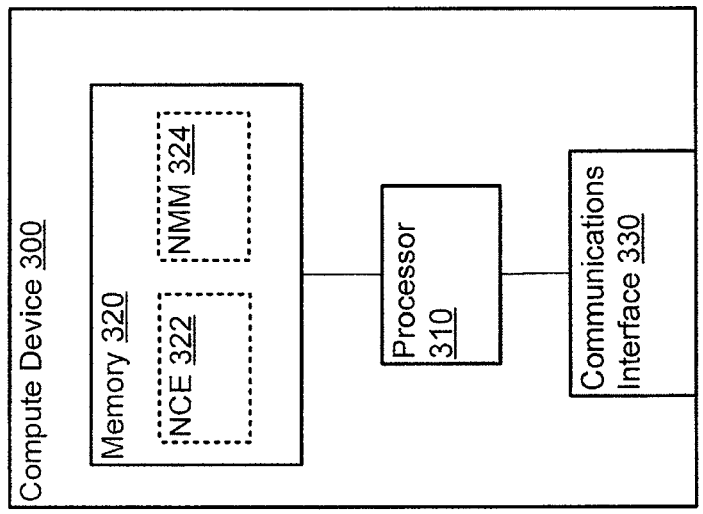
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can host a network control entity 322 and a network management module 324 similar to the network control entity 194 and the network management module 155, respectively. In other words, network control entity 322 and network management module 324 can be processes, applications, virtual machines, and/or some other software module (executing in hardware) or a hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules in addition to network control entity 322 and/or network management module 324. For example compute device 300 can be a general purpose compute device or compute node that hosts multiple processes, applications, virtual machines, and/or software modules.

Returning to FIG. 1, the communications network 110 can be any suitable communications network that operatively couples the access switches 120, 130, 140 to the other access switches 120, 130, 140. Additionally, the communications network can operatively couple the compute device 150 to the access switches 120, 130, 140. In some embodiments, the communications network 110 includes a data plane portion and a control plane portion. The control plane portion of the communications network 110 facilitates transmission of control signals (e.g., configuration information, forwarding-state information, etc.) between the network control entities 191-194 and the network management module 155. Accordingly, the network control entities 191-194 can send configuration information and/or forwarding-state information to other network control entities 191-194 via the control plane portion of the communications network 110. In some embodiments, the control plane portion of the communications network 110 includes direct links between the network control entity 194 and the network control entities 191-193. In other embodiments, the control plane portion of the communications network 110 can include intermediate modules and/or switches to operatively couple the network control entities 191-193 with the network control entity 194.

The data plane portion of the communications network 110 facilitates transmission of data between access switches 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first access switch 120, 130, 140 and a second access switch 120, 130, 140 (e.g., along with the data paths between the access switches 120, 130, 140 and the communications network 110). The data plane portion of the communications network 110 can couple (e.g., indirectly connect, facilitate communication between) the peripheral processing devices 171-175. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155, initiates network control entities 191-193 (by sending a signal to the access switches 120, 130, 140 via the control plane portion of the communications network 110, respectively) and, based on a processing capacity of the network control entities 191-193, assigns each port 121-124, 131-134, 141-144 to a network control entity 191-193. As shown in FIG. 1, for example, the network management module 155 associates ports 121-124, 131 and 132 (group of ports 183) with the network control entity 193; ports 133, 134 and 143 (group of ports 182) with the network control entity 192; and ports 141, 142 and 144 (group of ports 183) with the network control entity 191.

The network management module 155 can also initiate one or more intermediary network control entities and/or route reflectors by sending a signal to an access switch 120, 130, 140 and/or a computing device 150 via the control plane portion of the communications network 110. For example, the network management module 155 can initiate network control entity 194 by sending a signal to the computing device 150 via the control plane portion of the communications network 110. As shown and described above with respect to FIG. 4, each network control entity 191-193 can send control signals (i.e., signals within the control plane) to and receive control signals from the other network control entities 191-193 through network control entity 194. Additionally, as described in further detail herein, each network control entity 191-193 can store less forwarding-state information and/or routing information because the network control entity 194 can store some forwarding-state information and/or routing information in lieu of network control entities 191-193 maintaining all forwarding-state information and/or routing information. For example, each network control entity 191-193 does not store an address and/or identifier associated with the other network control entities 191-193 because the network control entity 194 stores such addresses and/or identifiers. As such, the network control entities 191-193 only store an address and/or identifier associated with the network control entity 194.

The network management module 155 can send configuration information and/or forwarding-state information (e.g., a configuration file) to each network control entity 191-194. In some embodiments, for example, each network control entity 191-193 can receive configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its associated group of ports 181-183 from the network management module 155. For example, network control entity 191 can receive configuration information and/or forwarding-state information associated with the group of ports 181, network control entity 192 can receive configuration information and/or forwarding-state information associated with the group of ports 182 and network control entity 193 can receive configuration information and/or forwarding-state information associated with the group of ports 183. The network control entity 194 can receive configuration information and/or forwarding-state information associated with the network control entities 191-193. As such, the network control entity 194 can act as an intermediary and/or a route reflector (e.g., a BGP Route Reflector) between the network control entities 191-193.

Each network control entity 191-193 can send initial and/or updated forwarding-state information to the other network control entities 191-193 when the forwarding-state associated with its group of ports 181-183 is initiated, changed and/or modified. For example, in response to the peripheral processing device 174 being initially coupled to the port 133, the network control entity 192 can send forwarding-state information associated with the port 133 and the destination peripheral processing device 174 to the network control entity 193. In other embodiments, the network control entity 192 can also send the forwarding-state information to the network control entity 191.

As shown in FIGS. 1 and 4, the network control entity 192 sends the forwarding-state information to the network control entity 194 via the path 167. Specifically, the network control entity 192 retrieves an identifier and/or address associated with the network control entity 194 (e.g., stored in a memory of the access switch 130) and sends the forwarding-state information accordingly. The network control entity 194 can then send the forwarding-state-information to the network control entity 193. Specifically, the network control entity 194 determines that the forwarding-state information should be sent to the network control entity 193 (e.g., the network control entity 193 is part of a same network segment as the network control entity 192), retrieves an identifier and/or address associated with the network control entity 193 (e.g., stored in a memory of the compute device 150), and sends the updated forwarding-state information accordingly. Such a path 167, 166 between the network control entity 192 and the network control entity 193 can be said to include multiple physical hops and multiple logical hops. In particular, the path 167, 166 between the network control entity 192 and the network control entity 193 includes two physical hops and two logical hops (e.g., 166, 167) within the control plane of the switch fabric system 100, as shown in FIG. 4.

In some embodiments, the network control entity 193 can store the forwarding-state information received from the network control entity 194 in a memory associated with the network control entity 193. For example, the network control entity 193 can store the forwarding-state information at the memory (e.g., memory 252) of the access switch 120 at which the network control entity 193 is located. Similarly stated, the network control entity 193 can update a configuration and/or forwarding-state table within the memory of the access switch 120 in response to receiving the forwarding-state information. In some embodiments, the forwarding-state information can be stored at a portion of the memory of the access switch 120 allocated and/or partitioned for the network control entity 193.

The network control entity 193 can then send the updated forwarding-state information to the access switches 120, 130 at which ports 121-124, 131, 132 associated with the network control entity 193 are located. In some embodiments, for example, the network control entity 193 can store the forwarding-state information at a portion of the memory (e.g., within a routing table) of the access switch 120 allocated and/or partitioned for data, processes and/or applications associated with the access switch 120. In such embodiments, the memory of the access switch 120 can store the forwarding-state information in a portion of the memory associated with the network control entity 193 as well as in a portion of the memory associated with the remaining entities, processes and/or modules of the access switch 120. In other embodiments, the forwarding-state information is stored within a single location within the memory of the access switch 120 accessible by the applicable processes at the access switch 120 (including the network control entity 193). The network control entity 193 also sends the forwarding-state information to the access switch 130 (ports 131 and 132 at access switch 130 are associated with the network control entity 193). Similar to the access switch 120, the access switch 130 can store the forwarding-state information within a memory (e.g., within a routing table).

A data packet (e.g., an Ethernet packet) can be sent between peripheral processing devices 171-175 using remaining portions of the switch fabric system 100. For example, a data packet can be sent from a source peripheral processing device 171 to a destination peripheral processing device 174. The source peripheral processing device 171 can send the data packet to the access switch 120 through port 121 using a first data link layer protocol (e.g., Ethernet, Fibre Channel, etc.). This is shown by path 161 in FIG. 1.

Based on the forwarding-state information received from the network control entity 193, the access switch 120 can prepare the data packet to enter the communications network 110. In some embodiments, for example, the access switch 120 can add and/or append a header (e.g., encapsulate) to the data packet having a destination address of the peripheral processing device 174 and/or the port 133. In some embodiments, the access switch 120 can also divide and/or partition the data packet into multiple data cells to be sent through the data plane portion of the communications network 110 to the access switch 130.

The data packet and/or cells is/are sent to the access switch 130 through the data plane portion of the communications network 110 as illustrated by path 162. The data plane portion of the communications network 110 can route and/or forward the data packet and/or cells based the destination address of the peripheral processing device 174 and/or the port 133. As such, the data plane portion of the communications network 110 can use a second data link layer protocol, different than the first data link layer protocol (e.g., Ethernet, Fibre Channel, etc.) used to send the data packet from the peripheral processing device 171 to the access switch 120. Accordingly, while the data packet can transverse multiple physical hops when in the communications network 110 (e.g., between stages of the multi-stage switch fabric), the path 162 between the access switch 120 and the access switch 130 can be a single logical hop from the perspective of the first data link layer protocol within the data plane portion of the communications network 110.

The access switch 130 can then prepare the data packet and/or cells to be sent to the peripheral processing device 174 via the port 133 as shown by path 163. Such preparation can include removing the header (e.g., decapsulating the data packet) having the destination address of the peripheral processing device 174 and/or the port 133 from the data packet and/or cells. In some embodiments, such preparation can also include reconstructing and/or reassembling the data packet from the data cells. More generally, the access switch 130 can prepare the data packet to be sent to the peripheral processing device 174 using the first protocol (e.g., Ethernet, Fibre Channel, etc.). After the data packet is ready, the access switch 130 sends the data packet to the peripheral processing device 174 through port 133.

In other embodiments, updated forwarding-state information is sent when requested by a network control entity (e.g., prior to sending data through the communications network 110). For example, the network control entity 193 managing the port 121 associated with the source peripheral processing device 171 can request forwarding-state information from the network control entity 192 managing the port 133 associated with the destination peripheral processing device 174. While not shown in FIG. 1 or FIG. 4, such a request can be sent via the network control entity 194 via connections within the control plane portion of the communications network 110.

In still other embodiments, the network control entity 194 can store forwarding-state information associated with each network control entity 191-193 with which it is associated. Accordingly, in such embodiments, the network control entity 193 sends the request for forwarding-state information to the network control entity 194. In response to the request, the network control entity 194 can send the forwarding-state information to the network control entity 193. In some embodiments, in response to a request, the network control entity 192 and/or the network control entity 194 also sends forwarding-state information associated with the other ports 134 and 143 of the group of ports 182 that the network control entity 192 manages.

Figure 5:
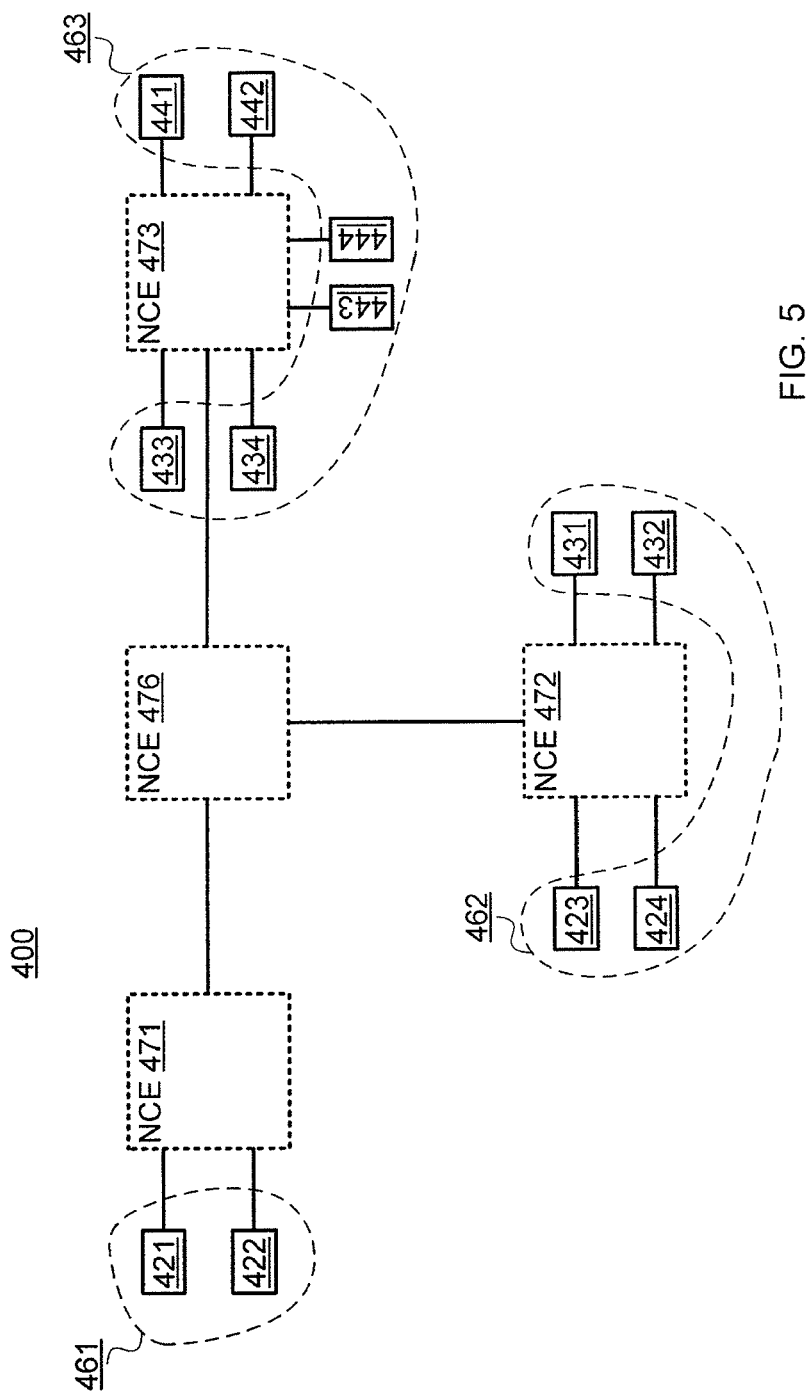
FIGS. 5-8 are logical representations of a control plane of a switch fabric system in different configurations, according to other embodiments.

FIGS. 5-8 are logical representations of a control plane of a switch fabric system in different configurations, according to other embodiments. FIG. 5, for example, illustrates a control plane of a switch fabric system in a first configuration 400. When in the first configuration 400, the switch fabric system includes a network control entity 471 managing and/or controlling a first group of ports 461 including ports 421 and 422, a network control entity 472 managing and/or controlling a second group of ports 462 including ports 423, 424, 431 and 432, and a network control entity 473 managing and/or controlling a third group of ports 463 including ports 433, 434, 441, 442, 443 and 444. Each port 421-424, 431-434, 441-444 can be physically located on any one of multiple access switches within the switch fabric system. For example, ports 421-424 can be physically located on a first access switch, ports 431-434 can be physically located on a second access switch and ports 441-444 can be physically located on a third access switch. Similarly, the network control entities 471, 472, 473 can be physically located at and/or executed by any one of multiple access switches within the switch fabric system.

The control plane of the switch fabric system also includes a network control entity 476 functioning as a route reflector between network control entity 471, network control entity 472 and network control entity 473. Accordingly, network control entity 471, network control entity 472 and network control entity 473 can send configuration information (e.g., port protocol information, network segment assignment information, port assignment information, peripheral processing device information, etc.) and/or forwarding-state information (e.g., port identifiers, network segment identifiers, peripheral processing device identifiers, etc.) to the other network control entities 471-473 via network control entity 476.

In some embodiments, a network management module (not shown in FIGS. 5-8) can maintain a configuration file. Such a configuration file can store and/or maintain configuration and/or forwarding-state information associated with the groups of ports 461, 462, 463. The network management module can then send appropriate configuration information and/or forwarding-state information to each of the network control entities 471, 472, 473, 476. FIG. 9, for example, illustrates a configuration file 500 associated with the first configuration. More specifically, FIG. 9 illustrates the configuration file 500 sent to network control entity 476. Network control entity 476 acts as an intermediary (e.g., route reflector) for the other network control entities 471, 472, 473 and, as such, receives the configuration and/or forwarding-state information associated with the network control entities 471, 472, 473 from the network management module. Network control entity 476 can then forward and/or send the relevant portions of the configuration file 500 to each of the other network control entities 471, 472, 473.

The configuration file 500 associates a network control entity 471, 472, 473 with a configuration associated with the group of ports that network control entity manages. For example, the configuration A can be associated with the group of ports 461, the configuration B can be associated with the group of ports 462 and the configuration C can be associated with the group of ports 463. As such, and as illustrated in FIG.

9, when the control plane of the switch fabric system is in the first configuration 400, network control entity 476 can send the configuration A to network control entity 471, the configuration B to network control entity 472 and the configuration C to network control entity 473.

The network control entity 476 can store identifiers and/or addresses of the network control entities 471, 472, 473. Accordingly, the network control entity 476 can send initial configurations to the network control entities 471, 472, 473. Additionally, as discussed above, the network control entity 476 can send and/or forward updated forwarding-state information received from a network control entity 471, 472, 473 to the other network control entities 471, 472, 473. In such embodiments, the network control entities 471, 472, 473 do not store the address and/or identifier associated with the other network control entities 471, 472, 473, but only store the address and/or identifier associated with the network control entity 476.

In some embodiments, as discussed above, the network control entity 476 can enforce rules and/or policies associated with different network segments. For example, if the network control entity 471 and the network control entity 472 are associated with a first network segment and network control entity 473 is associated with a second network segment, the network control entity 476 can allow the network control entity 472 to send forwarding-state information to the network control entity 471 but not the network control entity 473. In some embodiments, the network segments can be similar to the network segments shown and described in co-pending U.S. patent application Ser. No. 12/969,277, entitled "Methods and Apparatus for Forwarding-State Transport in a Distributed Control Plane," filed on the same date, which is incorporated herein by reference in its entirety.

Figure 6:
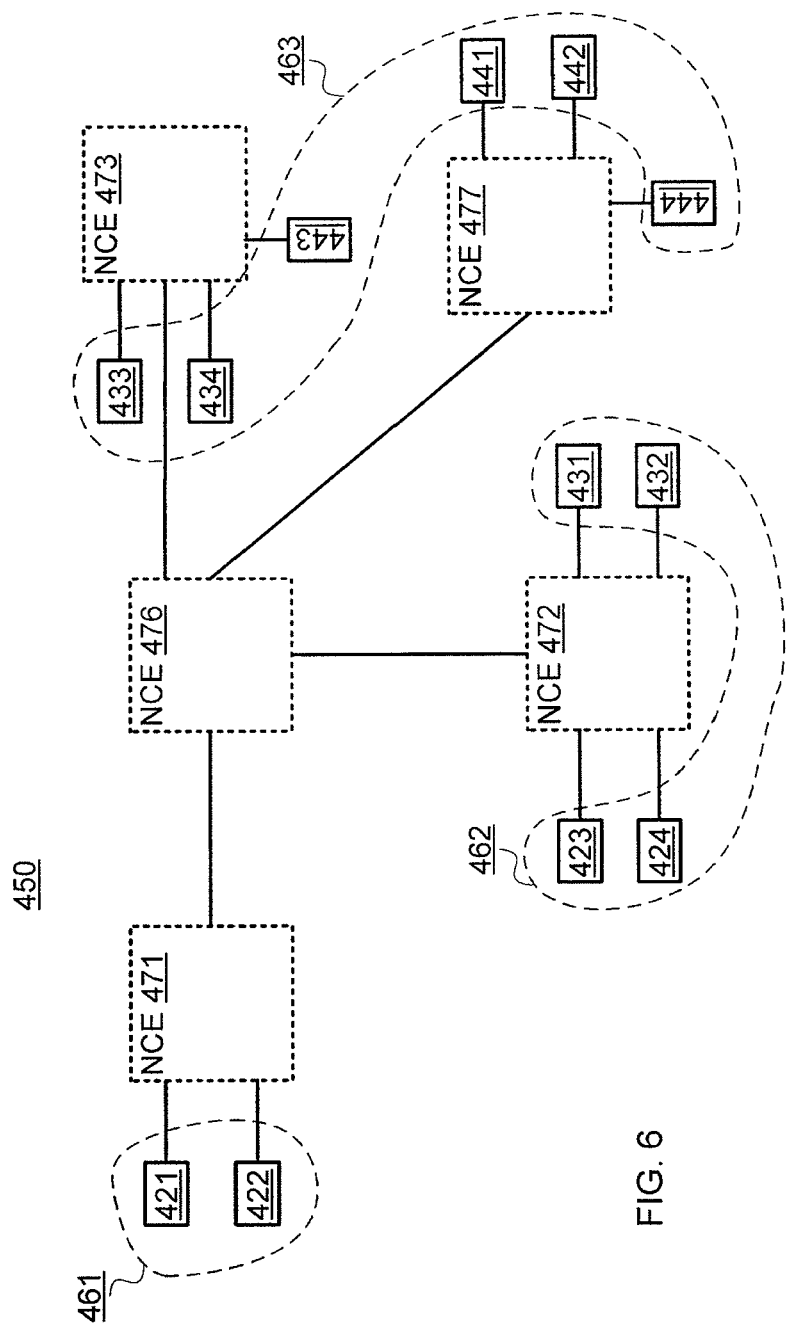

FIG. 6 illustrates the control plane of the switch fabric system in a second configuration 450. When in the second configuration 450, the switch fabric system includes network control entity 477. Network control entity 477 and network control entity 473 manage and/or control the ports 433, 434, 441, 442, 443, 444 within the group of ports 463. More specifically, network control entity 473 manages and/or controls the ports 433, 434, 443, and network control entity 477 manages and/or controls the ports 441, 442, 444.

FIG. 10 illustrates a configuration file 510 associated with the second configuration 450. Similar to the configuration file 500, the network management module (not shown) can send the configuration file 510 to network control entity 476. Network control entity 476 can then send and/or forward relevant portions of the configuration file 510 to the other network control entities 471, 472, 473, 477. In the second configuration 450, for example, the network management module can divide the configuration C into the configuration C' (associated with ports 433, 434, 443) and the configuration C" (associated with ports 441, 442, 444). Accordingly, network control entity 476 can send the configuration C' to network control entity 473 and the configuration C" to network control entity 477.

The control plane of the switch fabric system can change and/or move from its first configuration 400 (FIG. 5) to its second configuration 450 (FIG. 6) when an available processing capacity of network control entity 473 crosses (e.g., falls below) a threshold. Similarly stated, the control plane of the switch fabric system can change from its first configuration 400 to its second configuration 450 when network control entity 473 no longer has the available resources to manage the entire group of ports 463. In some embodiments, the network management module can monitor the activity of network control entity 473 and, when the available capacity of network control entity 473 crosses the threshold, the network management module can initiate network control entity 477. The network management module can then assign and/or associate the ports 441, 442, 444 with network control entity 477. Similarly, the network management module can then disassociate the ports 441, 442, 444 from network control entity 473. In some embodiments, the network management module can update a configuration table managed by the network management module to reflect the change from the first configuration 400 to the second configuration.

Figure 7:
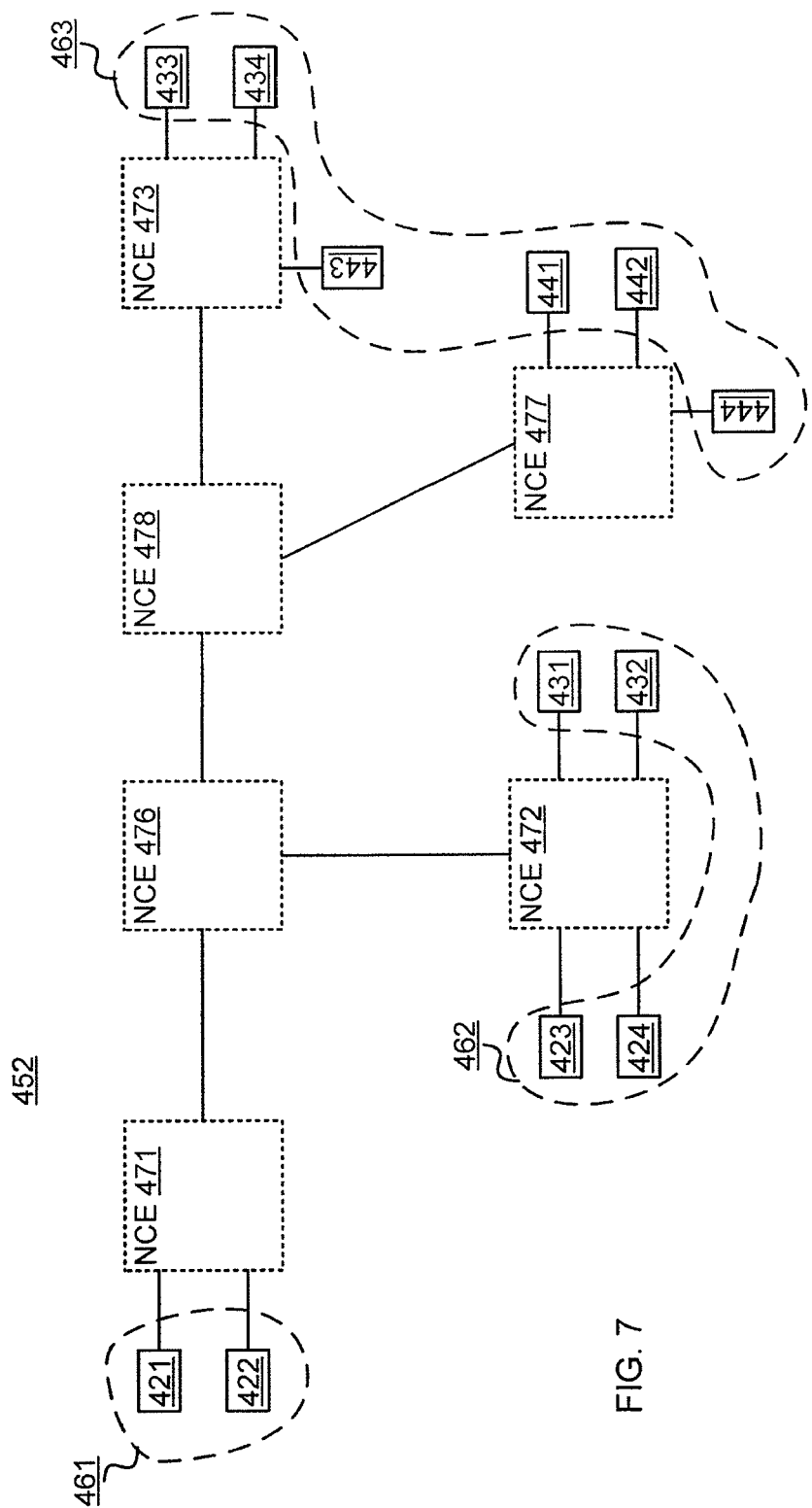

FIG. 7 illustrates the control plane of the switch fabric system in a third configuration 452. When in the third configuration 452, the control plane of the switch fabric system includes network control entity 478. Network control entity 478 can be a route reflector that acts as an intermediary for network control entity 473 and network control entity 477. Accordingly, network control entity 472 can send forwarding-state information to network control entity 473 and/or network control entity 477 via network control entity 476 and network control entity 478. Network control entity 473 can send forwarding-state information to network control entity 477 using only network control entity 478. Because network control entity 473 and network control entity 477 are both managed by network control entity 478, any forwarding-state information sent between network control entity 473 and network control entity 477 does not need to pass through network control entity 476.

FIG. 11 illustrates a configuration file 520 associated with the third configuration 452 from the perspective of network control entity 476. As such, when the control plane of the switch fabric system is in the third configuration 452, the network management module can send the configuration file 520 to network management module 476. Network management module 476 can then send the configuration A (associated with the group of ports 461) to network control entity 471, the configuration B (associated with the group of ports 462) to network control entity 472 and the configuration C (associated with the group of ports 463) to network control entity 478.

FIG. 12 illustrates a configuration file 525 associated with the third configuration 452 from the perspective of network control entity 478. For example, network control entity 478 receives the configuration C from network control entity 476 and can divide the configuration C into the configuration C' (associated with ports 433, 434, 443) and the configuration C" (associated with ports 441, 442, 444). Network control entity 478 can then send the configuration C' to network control entity 473 and the configuration C" to network control entity 477.

The control plane of the switch fabric system can change and/or move from its second configuration 450 (FIG. 6) to its third configuration 452 (FIG. 7) when an available processing capacity of network control entity 476 crosses a threshold. Similarly stated, the switch fabric system can change from its second configuration 450 to its third configuration 452 when network control entity 476 no longer has the available resources to manage the network control entities 471, 472, 473, 477. In some embodiments, the network management module can monitor the activity of network control entity 476 and, when the available capacity of network control entity 476 crosses the threshold, the network management module can initiate network control entity 478. The network management module can then assign and/or associate the network control entities 473, 477 with network control entity 478. Similarly, the network management module can then disassociate the network control entities 473, 477 from network control entity 476. In some embodiments, the network management module can update a configuration table managed by the network management module to reflect the change from the second configuration 450 to the third configuration 452.

Figure 8:
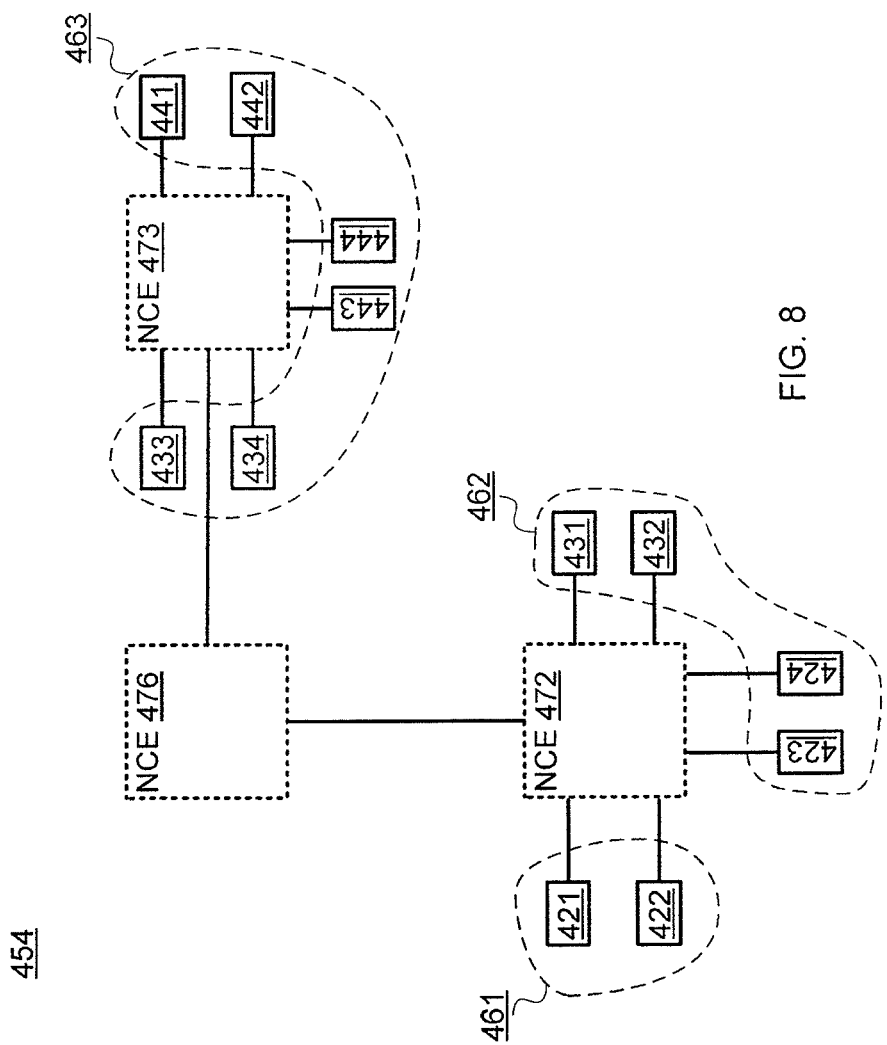

FIG. 8 illustrates the control plane of the switch fabric system in a fourth configuration 454. When in the fourth configuration 454, the control plane of the switch fabric system is similar to the switch fabric system in the first configuration 400, excluding network control entity 471. Accordingly, in the fourth configuration 454, the group of ports 461 (including the ports 421 and 422) are associated with network control entity 472. As such, network control entity 472 manages both the group of ports 461 and the group of ports 462.

FIG. 13 illustrates a configuration file 530 associated with the fourth configuration 454. Similar to the configuration file 500, the network management module (not shown) can send the configuration file 530 to network control entity 476. Network control entity 476 can then send and/or forward relevant portions of the configuration file 530 to the other network control entities 472, 473. In the fourth configuration 454, for example, network control entity 476 can send both the configuration A and the configuration B to network control entity 472 and the configuration C to network control entity 473.

The control plane of the switch fabric system can change and/or move from its first configuration 400 (FIG. 5) to its fourth configuration 454 (FIG. 8) when an available processing capacity of network control entity 471 and/or network control entity 472 crosses (e.g., rises above and/or exceeds a threshold). Similarly stated, the control plane of the switch fabric system can change from its first configuration 400 to its fourth configuration 454 when network control entity 471 and/or network control entity 472 has an amount of available and/or unused resources and/or processing capacity. In some embodiments, the network management module can monitor the activity of network control entity 471 and/or network control entity 472 and, when the available capacity of network control entity 471 and/or network control entity 472 crosses the threshold, the network management module can combine and/or merge network control entity 471 and network control entity 472. For example, if a combined capacity of network control entity 471 and network control entity 472 crosses the threshold, the network management module can terminate, deactivate and/or dallocate network control entity 471. The network management module can then assign and/or associate the group of ports 461 with network control entity 472. In some embodiments, the network management module can update a configuration table managed by the network management module to reflect the change from the first configuration 400 to the fourth configuration 454.

The first configuration (FIG. 5), the second configuration (FIG. 6), the third configuration (FIG. 7) and the fourth configuration (FIG. 8) of the control plane of the switch fabric system are shown and described above as examples of the dynamic nature of the control plane of the switch fabric system. In other embodiments, any configuration of network control entities (including route reflectors), groups of ports and/or ports can be defined. As such, a network management module can initiate and/or terminate network control entities as an amount of processing resources used to manage a system increases and/or decreases. Additionally, a network management module can initiate or terminate network control entities within a portion of the control plane having insufficient or excess processing capacity, respectively.

Figure 14:
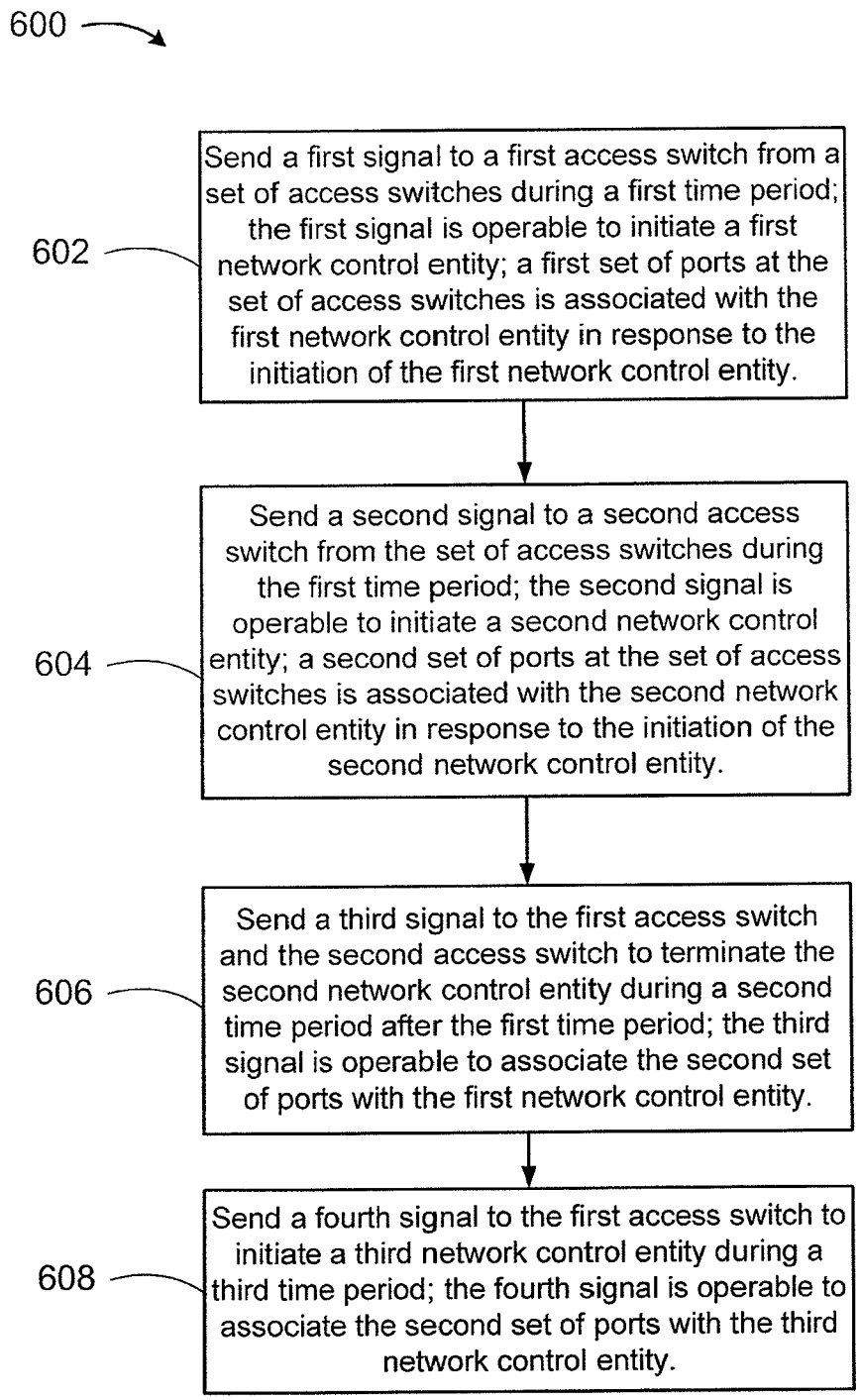
FIG. 14 is a flow chart illustrating a method of dynamically managing a control plane of a switch fabric system, according to another embodiment.

FIG. 14 is a flow chart illustrating a method 600 of dynamically managing a control plane of a switch fabric system, according to another embodiment. The method 600 includes sending a first signal to a first access switch from a set of access switches during a first time period, at 602. The first signal initiates a first network control entity. A first set of ports at the set of access switches is associated with the first network control entity in response to the initiation of the first network control entity. Accordingly, as discussed above, the first network control entity manages and/or control the first set of ports. In some embodiments, the first network control entity can be located at and/or executed on the first access switch.

A second signal is sent to a second access switch from the set of access switches during the first time period, at 604. The second signal initiates a second network control entity. A second set of ports at the set of access switches is associated with the second network control entity in response to the initiation of the second network control entity. The second set of ports is mutually exclusive of the first set of ports. The second network control entity manages and/or controls the second set of ports. In some embodiments, the second network control entity can be located at and/or executed on the second access switch.

A third signal is sent to the first access switch and the second access switch to terminate, deactivate and/or deallocate the second network control entity during a second time period after the first time period, at 606. The third signal associates the second set of ports with the first network control entity. Thus, after the second time period, the first network control entity manages and/or controls both the first set of ports and the second set of ports. In some embodiments, the third signal can be sent in response to an available processing capacity of the first network control entity and/or the second network control entity crosses (e.g., exceeds) a threshold. In some embodiments, for example, if a combined available capacity of the first network control entity and the second network control entity crosses a threshold, one of the first network management module and the second network management module can be terminated, deactivated and/or deallocated. Similarly stated, if a single network management module is capable of managing both the first set of ports and the second set of ports (e.g., has the capacity and/or processing resources), the second network management module can be terminated, deactivated and/or deallocated.

A fourth signal is sent to the first access switch to initiate a third network control entity during a third time period, at 608. The fourth signal is operable to associate the second set of ports with the third network control entity. In some embodiments, the fourth signal can be sent in response to an available processing capacity of the first network control entity falling below a threshold. Similarly stated, the fourth signal can be sent when the first network control entity is not capable of managing both the first set of ports and the second set of ports (e.g., does not have the capacity and/or processing resources) so that the third network control entity can be initiated to manage the second set of ports while the first network control entity continues to manage the first set of ports.

While the method 600 includes both terminating a network control entity (e.g., the second network control entity) and initiating a network control entity (e.g., the third network control entity), in other embodiments, a method does not necessarily include both terminating and initiating a network control entity. For example, in some embodiments, a method can include neither terminating or initiating a network control entity. For another example, a method can include only terminating a network control entity or only initiating a network control entity. Additionally, in other embodiments, more than a single network control entity can be initiated and/or terminated.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software to perform computations on relatively heavy network workloads. In some embodiments, the services nodes can perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, some embodiments of a switch fabric system (e.g., FIG. 1) include a route reflector while others do not.

What is claimed is:

1. A system, comprising:
a plurality of access switches configured to be operatively coupled to a switch fabric, the plurality of access switches having a plurality of ports and each being operatively coupled to a plurality of peripheral processing devices,
a first set of ports from the plurality of ports and a second set of ports from the plurality of ports being managed by a first network control entity located at a first access switch from the plurality of access switches when the system is in a first capacity configuration,
the first set of ports being managed by the first network control entity and the second set of ports being managed by a second network control entity located at a second access switch from the plurality of access switches when the system is in a second capacity configuration,
the second network control entity being automatically initiated when the system is changed from the first capacity configuration to the second capacity configuration, the system is changed from the first capacity configuration to the second capacity configuration in response to the system in the first capacity configuration exceeding a capacity threshold.

2. The system of claim 1, wherein the first set of ports from the plurality of ports includes at least one port at the first access switch and at least one port at the second access switch from the plurality of access switches.

3. The system of claim 1, wherein the system is automatically changed from the first capacity configuration to the second capacity configuration when an available processing capacity of the first network control entity crosses the capacity threshold.

4. The system of claim 1, wherein the first network control entity maintains forwarding-state information associated with the first set of ports and the second set of ports when the system is in the first capacity configuration, the first network control entity maintains forwarding-state information associated with the first set of ports and not the second set of ports and the second network control entity maintains forwarding-state information associated with the second set of ports and not the first set of ports when the system is in the second capacity configuration.

5. The system of claim 1, wherein the second network control entity is terminated when the system is changed from the second capacity configuration to the first capacity configuration.

6. The system of claim 1, wherein the first network control entity is operable to send forwarding-state information associated with a peripheral processing device from the plurality of peripheral processing devices, the peripheral processing device being operatively coupled to a port from the first set of ports to the second network control entity.

7. The system of claim 1, wherein a third network control entity is automatically initiated when the system is changed from the first capacity configuration to the second capacity configuration, the third network control entity being a route reflector between the first network control entity and the second network control entity when the system is in the second capacity configuration.

8. The system of claim 1, wherein the first network control entity is operable to receive configuration information associated with the first set of ports and the second set of ports when the system is in the first capacity configuration, the first network control entity to receive configuration information associated with the first set of ports and not the second set of ports when the system is in the second capacity configuration.

9. A non-transitory processor-readable medium storing code representing instructions to cause a processor to:
send a first signal to a first access switch from a plurality of access switches during a first time period, the first signal to initiate a first network control entity at the first access switch from the plurality of access switches, a first plurality of ports at the plurality of access switches being associated with the first network control entity in response to the initiation of the first network control entity;
send a second signal to a second access switch from the plurality of access switches during the first time period, the second signal to initiate a second network control entity at the second access switch from the plurality of access switches, a second plurality of ports at the plurality of access switches being associated with the second network control entity in response to the initiation of the second network control entity, the second plurality of ports being mutually exclusive of the first plurality of ports; and
send a third signal to the first access switch and the second access switch to terminate the second network control entity during a second time period after the first time period when a combination of a capacity for the first network control entity and a capacity for the second network control entity falls below a capacity threshold, the third signal to associate the second plurality of ports with the first network control entity.

10. The non-transitory processor-readable medium of claim 9, further comprising code representing instructions to cause the processor to:
send configuration information associated with the first plurality of ports to the first access switch during the first time period;
send configuration information associated with the second plurality of ports to the second access switch during the first time period; and
send configuration information associated with the first plurality of ports and the second plurality of ports to the first access switch during the second time period.

11. The non-transitory processor-readable medium of claim 9, further comprising code representing instructions to cause the processor to:
receive a fourth signal after the first time period and before the second time period indicating that the capacity of the second network control entity crossed the capacity threshold, the code representing instructions to cause the processor to send the third signal being executed in response to receiving the fourth signal.

12. The non-transitory processor-readable medium of claim 9, wherein the first plurality of ports includes at least one port at the first access switch and at least one port at the second access switch.

13. The non-transitory processor-readable medium of claim 9, further comprising code representing instructions to cause the processor to:
send a fourth signal to the first access switch to initiate a third network control entity during a third time period, the fourth signal o associate the second plurality of ports with the third network control entity.

14. The non-transitory processor-readable medium of claim 9, further comprising code representing instructions to cause the processor to:
update a configuration table to disassociate the second plurality of ports from the second network control entity and associate the second plurality of ports with the first network control entity in response to sending the third signal.

15. A system implemented in at least one of a memory or a processor, comprising:
a network management module configured to manage a configuration table associated with a switch fabric; and
a network control entity configured to manage a first set of ports from a plurality of ports when the system is in a first configuration, each port from the plurality of ports being located at a first access switch from a plurality of access switches or a second access switch from the plurality of access switches, the plurality of access switches configured to be operatively coupled to the switch fabric, the network control entity being located at the first access switch from the plurality of access switches, the first set of ports including at least one port located at the first access switch and at least one port located at the second access switch from the plurality of access switches, the network control entity to manage the first set of ports and a second set of ports from the plurality of ports when the system is in a second configuration, the second set of ports being mutually exclusive of the first set of ports, the network control entity to receive a first portion of the configuration table from the network management module associated with the first set of ports when the system is in the first configuration, the network control entity to receive a second portion of the configuration table from the network management module associated with the first set of ports and the second set of ports when the system is in the second configuration.

16. The system of claim 15, wherein the network control entity is a first network control entity, the system further comprising:

a second network control entity implemented in at least one of a third memory or a third processor and configured to manage a second set of ports from the plurality of ports, the second network control entity being located at the first access switch, each port from the second set of ports is located at the first access switch from the plurality of access switches.

17. The system of claim 15, wherein the network control entity is a first network control entity, the system further comprising:

a second network control entity configured to manage a second set of ports from the plurality of ports, the second network control entity to receive a third portion of the configuration table from the network management module associated with the second set of ports.

18. The system of claim 15, wherein the network control entity is a first network control entity, the first network control entity to manage a first subset of ports from the first set of ports when the system is in the second configuration, the system further comprising:

a second network control entity configured to manage a second subset of ports from the first set of ports when the system is in the second configuration, the system is automatically changed from the first configuration to the second configuration when an available processing capacity of the first network control entity crosses a capacity threshold.

* * * * *